(12) United States Patent
Monroe et al.

(10) Patent No.: US 7,774,855 B2
(45) Date of Patent: Aug. 10, 2010

(54) INTEGRITY MONITORING SYSTEM AND DATA VISUALIZATION TOOL FOR VIEWING DATA GENERATED THEREBY

(75) Inventors: Klayton Monroe, Elicott City, MD (US); Bruce Mayhew, Highland, MD (US); Bridget Kennedy, Crownsville, MD (US); William Wilson, Cupertino, CA (US)

(73) Assignee: Savvis Communications Corporation, Town & Country, MI (US)

( * ) Notice: Subject to any disclaimer, the term of this patent is extended or adjusted under 35 U.S.C. 154(b) by 911 days.

(21) Appl. No.: 10/768,738

(22) Filed: Feb. 2, 2004
(Under 37 CFR 1.47)

(65) Prior Publication Data
US 2005/0120239 A1    Jun. 2, 2005

Related U.S. Application Data

(63) Continuation of application No. 10/430,375, filed on May 7, 2003, now abandoned.

(60) Provisional application No. 60/377,981, filed on May 7, 2002, provisional application No. 60/377,982, filed on May 7, 2002.

(51) Int. Cl.
*H04L 9/36* (2006.01)
*H04L 29/10* (2006.01)

(52) U.S. Cl. .................. 726/30; 713/165; 713/176; 713/187

(58) Field of Classification Search ............ 726/22–24, 726/30, 13; 713/161, 165–167
See application file for complete search history.

(56) References Cited

U.S. PATENT DOCUMENTS 6,587,945 B1 * 7/2003 Pasieka .................. 713/176
7,069,594 B1 * 6/2006 Bolin ..................... 726/26

OTHER PUBLICATIONS

Sedaghat, S. et al. "A Dynamic Web Agent for Verifying the Security and Integrity of a Web Site's Contents." Computer Supported Cooperative Work in Design, The Sixth International Conference(2001):330-337.*
Michener, John et al. "Managing System and Active-Content Integrity". Computer(Jul. 2000):108-110.*
Park, Joon et al. "Secure Cookies on the Web".IEEE Internet Computing(Jul.-Aug. 2000):36-44.*

* cited by examiner

*Primary Examiner*—Jung Kim
*Assistant Examiner*—Venkat Perungavoor
(74) *Attorney, Agent, or Firm*—Kenyon & Kenyon LLP

(57) ABSTRACT

A computer-implemented system, method and software program product for retrieving and displaying large amounts of data in a computer system. The system comprising an integrity client computer, an analyst client computer, a visual display unit, a pointing device, an integrity checker, an integrity server interconnected to the integrity checker, a user interface, and at least one integrity database. The integrity checker is located on the integrity client computer. The integrity checker checks status of files located on the integrity client computer. The integrity server collects, stores and retrieves data generated by the integrity checker. The at least one integrity database is located in the integrity server and stores data provided by the integrity checker. The user interface is located on the analyst client computer and interconnected to the integrity server, and the user interface retrieves data stored by the integrity server and displays the data on the visual display unit to allow a user to analyze the data.

18 Claims, 34 Drawing Sheets

FIG. 22A

Genetic Query  — □ ×

Client ID: R001 CATT 0005 1 ▼   Query Limit: 10 ▼   Predefined Queries: Run History ▼

Enter Genetic SQL Query:
select * from run_history

[Clear] [Add] [Save]

Query Results

| Run ID | Run Data | Changed | Missing | New | Log | Total Files | Violations | Exceptions | Authorize |
|---|---|---|---|---|---|---|---|---|---|
| 1 | 2001-05-11 04:54:01 | 0 | 0 | 7392 | 100 | 7392 | 7392 | 0 | 0 |
| 2 | 2001-05-11 16:54:01 | 0 | 0 | 0 | 100 | 7392 | 0 | 0 | 0 |
| 3 | 2001-05-15 19:54:09 | 1 | 0 | 0 | 102 | 7392 | 1 | 0 | 0 |
| 4 | 2001-05-16 01:54:16 | 0 | 0 | 0 | 102 | 7392 | 0 | 0 | 0 |
| 5 | 2001-05-17 16:54:01 | 1 | 0 | 0 | 100 | 7392 | 1 | 0 | 0 |
| 6 | 2001-05-17 19:54:01 | 0 | 0 | 0 | 100 | 7392 | 0 | 0 | 0 |
| 7 | 2001-05-17 22:54:01 | 0 | 0 | 0 | 100 | 7392 | 0 | 0 | 0 |
| 8 | 2001-05-18 16:54:02 | 0 | 0 | 0 | 100 | 7392 | 0 | 0 | 0 |

[Configure]   [Start Query]   [Print]   [Clear All]

Status Information:

FIG. 22D

Tracker (0.9.8)
File Comment View Window Forms

Table Browser | Tree Browser

- 090 2001-06-21 22:54:02
- 089 2001-06-21 19:54:00
- 088 2001-06-21 16:54:01 8
  - c: (1)
    - winnt (2)
      - ms (1)
      - sms (2)
        - core (2)
          - bin (1)
            - coreinst.log
          - data (3)
            - smsasign.ini
            - smsdisc.ddr
            - temp.tcf
        - logs (3)
          - clicore.log
          - wn_logon.lo_
          - wn_logon.log
    - system32 (1)
      - Mperflib_perfdata_410
- 087 2001-06-20 22:54:01 1
- 086 2001-06-20 19:54:02 2

Client ID: | Run ID: R001_CATT_0005_1 | 88

| Category | File Name | Size | Findex | atime |
|---|---|---|---|---|
| C | c:\winnt\ms\sms\logs\wn_logon.log | 11856 | 5629499534250099 | 2001-06-20 22:42:09 |
| C | c:\winnt\ms\sms\logs\wn_logon.log | 18214 | 3940649673987596 | 2001-06-21 16:42:54 |
| C | c:\winnt\ms\sms\core\data\smsasign.ini | 161 | 3940649673987596 | 2001-06-20 22:42:09 |
| C | c:\winnt\ms\sms\core\data\smsasign.ini | 198 | 3940649673987596 | 2001-06-21 16:42:53 |
| C | c:\winnt\ms\sms\core\bin\coreinst.log | 4314 | 4222124650698250 | 2001-06-20 22:42:08 |
| C | c:\winnt\ms\sms\core\bin\coreinst.log | 6469 | 4222124650698250 | 2001-06-21 16:42:52 |
| C | c:\winnt\ms\sms\core\data\temp.tcf | 5443 | 3659174697275792 | 2001-06-20 22:42:09 |
| C | c:\winnt\ms\sms\core\data\temp.tcf | 5831 | 3659174697275792 | 2001-06-21 16:42:53 |
| C | c:\winnt\ms\sms\core\data\smsdisc.ddr | 1061 | 5910974510961048 | 2001-06-20 22:42:09 |
| C | c:\winnt\ms\sms\core\data\smsdisc.ddr | 1042 | 5910974510961048 | 2001-06-21 16:42:53 |
| C | c:\winnt\ms\sms\logs\wn_logon.lo_ | 20583 | 3659174697275726 | 2001-06-20 22:42:09 |
| C | c:\winnt\ms\sms\logs\wn_logon.lo_ | 20567 | 5629499534250099 | 2001-06-21 16:42:54 |
| C | c:\winnt\ms\sms\logs\clicore.log | 5837 | 1660702362565715 | 2001-06-20 22:42:09 |
| C | c:\winnt\ms\sms\logs\clicore.log | 8733 | 2251799813690157 | 2001-06-21 16:42:54 |

Configure | ● Show Diffs | Apply: Authorize-Files | Select all: Authorize-Files

Company Details | Client Details | SNAPSHOT | BASELINE | Changed-WIN32

FIG. 22F

Tracker (0.9.8)
File Comment View Window Forms

Table Browser / Tree Browser

- R001
  - ASUB
  - BADM
  - CATT
    - 0001_0
    - 0001_1
    - 0004_0  Delinquent since 2001-08-20
    - 0004_1  Delinquent since 2001-08-17
    - 0005_0
    - 0005_1
    - 0006_0
    - 0006_1
  - DCEX
  - EXDS
  - RAND
  - SEAX
  - TEST
  - ZADL Company ID: CATT  Company Name: Cyber Attack Tiger Team  Company Profiles: 8  Profile Anomalies: 7

| Host | Profile | Scans | Scan Anomalies |
|------|---------|-------|----------------|
| 0005 | 0 | 0 | 0 |
| 0005 | 1 | 97 | 28 |
| 0006 | 0 | 1 | 1 |
| 0001 | 0 | 14 | 14 |
| 0001 | 1 | 2487 | 23 |
| 0004 | 0 | 4 | 4 |
| 0004 | 1 | 52 | 38 |
| 0006 | 1 | 2367 | 43 |

Configure  Company Details

FIG. 22H

| Field Name | Displayed |
|---|---|
| ID | ☐ |
| Category | ☑ |
| Type | ☐ |
| File name | ☑ |
| Size | ☑ |
| findex | ☑ |
| Name MD5 | ☐ |
| atime | ☑ |
| Volume | ☐ |
| ams | ☑ |
| mtime | ☑ |
| attributes | ☐ |
| mms | ☑ |
| ctime | ☑ |
| cms | ☑ |
| chtime | ☑ |

OK | Apply | Select All

R001_CATT_0005_1 | | Run ID: | | 76 |

| File Name | Size | Findex | atime | |
|---|---|---|---|---|
| \winnt\infq299618.pnf | 8872 | 10133091616932798 | 2001-06-13 | 16:42:5 |
| \winnt\system32\spool\drivers\w32... | 98816 | 197032483701294 | 2001-06-13 | 16:42:2 |
| \winnt\system32\spool\drivers\w32... | 76800 | 168884986030295 | 2001-06-13 | 16:42:2 |
| \winnt\system32\drivers\ipsecdrv.sys | 69120 | 23362423067028089 | 2001-06-13 | 16:41:2 |
| \winnt\system32\irebase.dll | 124928 | 11821949021896701 | 2001-06-13 | 16:41:4 |
| \winnt\system32\set117.tmp | 492304 | 168884986030232 | 2001-06-13 | 16:42:1 |
| \winnt\system32\irecqx.dll | 144384 | 112589990647586 | 2001-06-13 | 16:41:4 |
| \winnt\system32\spool\drivers\w32... | 601600 | 2533274790433253 | 2001-06-13 | 16:42:2 |
| \winnt\inf\netexta.pnf | 5460 | 5225864417610... | 2001-06-13 | 16:42:5 |
| \winnt\system32\vmsoss.dll | 206096 | 10977524091764743 | 2001-06-13 | 16:41:5 |
| \winnt\system32\iresc.dll | 77312 | 12947848928739324 | 2001-06-13 | 16:41:4 |
| \winnt\system32\spool\drivers\w32... | 213504 | 197032483701294 | 2001-06-13 | 16:42:2 |
| \winnt\system32\spool\drivers\w32... | 55808 | 168884986030288 | 2001-06-13 | 16:42:2 |
| \winnt\system32\spool\drivers\w32... | 108032 | 2533274790400612 | 2001-06-13 | 16:42:2 |
| c:\winnt\infnem5.inf | 1501 | 8725724278079542 | 2001-06-13 | 16:42:1 |
| | 1501 | 13426356389103... | 2001-06-13 | 16:42:5 |

Configure

Company Details | Client Details | Changed-WIN32 | File Details | Violations-WIN32 | Apply: Authorize-Files | New-WIN32 | Select all: Authorize-Files ○ 090
○ 089
○ 088 c:
    ○ system32 (1)
        Mperflib_perfdata_410
○ 087 2001-06-20 22:54:01 1
○ 086 2001-06-20 19:54:02 2

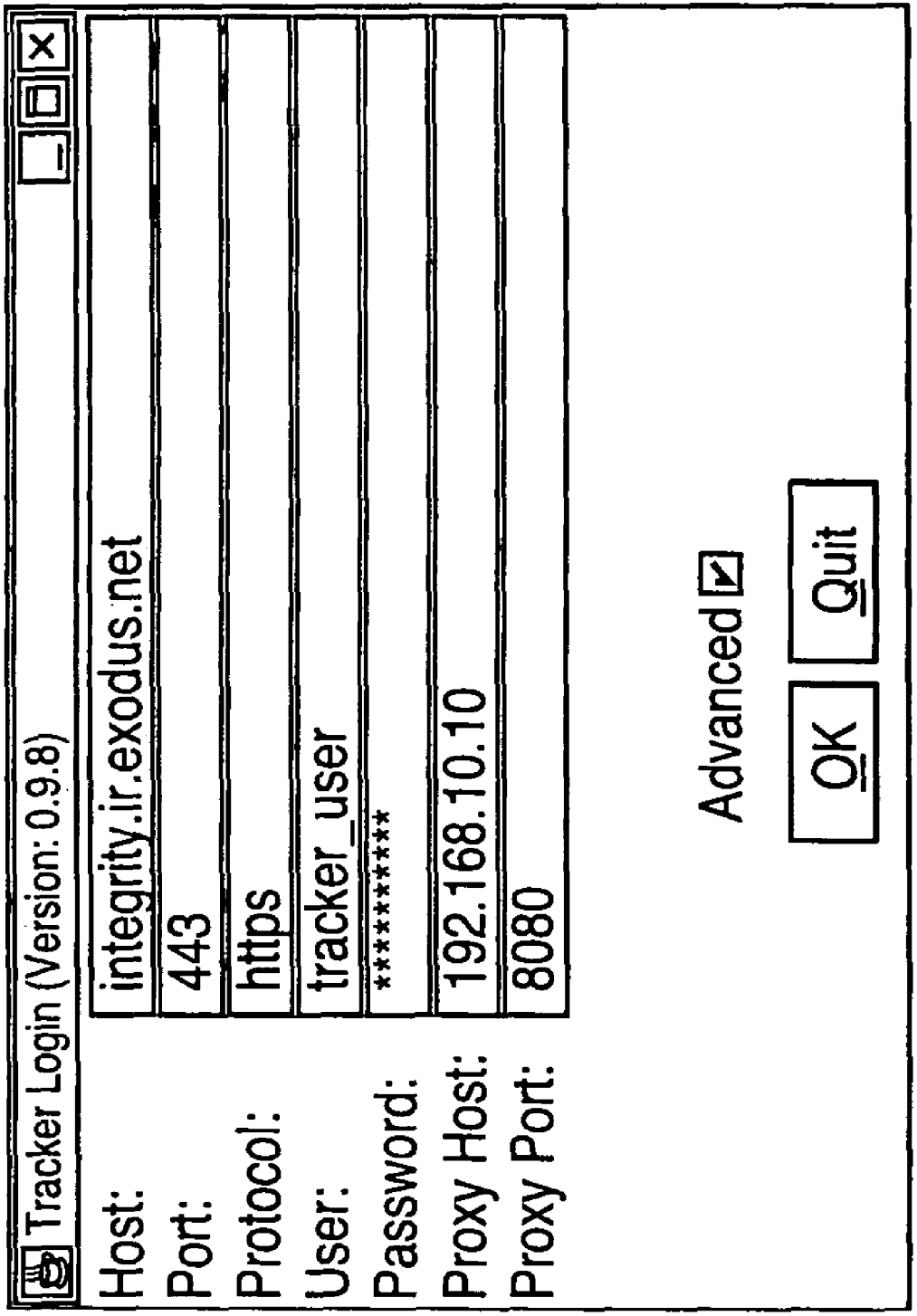

FIG. 22K

Profile Manager

Client Information (Blank filed Required)

| Field | Value | | Field | Value |
|---|---|---|---|---|
| Company Symbol | EXDS | Company Query | Serial Number | 36170 |
| Company Name | Exodus Communications, Inc. | | Customer ID | 145091 |
| Data Center | DC-DC2 | OS UNIX | Serv. Eq. ID | 1.ABWF03 |
| Hostname | runner.frog.net | | Part Number | EXO-PS-CAMS-CIMS-NIR |
| IP Address | 192.168.50.50 | | Alert Email 1 | alert@frog.net |
| Admin Name | Logan Hunter | | Alert Email 2 | |
| Admin Email | lhunter@frog.net | | Alert Email 3 | |
| Admin Phone | 347-555-1298 | | Alert Email 4 | |
| DB Quota KB | 50000 | | Scan Period | 1 Hour |
| Profile | Primary 0 | | DB Queue | Paused |

Shows the email address of who to notify in the case of a discrepancy during a scan

Admin/Server Assigned Values

| Field | Value | | Field | Value |
|---|---|---|---|---|
| Client ID: | | Query | Post Password | Password |
| Post ID: | | Post Port | Post CGI | |

Status Field

This is an example of a properly filled in form.

[Create] [Config File] [Example] [Reset] [Update] [Delete]

FIG. 22M

INTEGRITY MONITORING SYSTEM AND DATA VISUALIZATION TOOL FOR VIEWING DATA GENERATED THEREBY

PRIORITY DATA AND RELATED APPLICATIONS

This utility patent application is related to and claims priority from U.S. Provisional patent applications Nos. 60/377,981 and 60/377,982, the contents of which are incorporated herein by reference.

BACKGROUND OF INVENTION

1. Field of Invention

This invention relates to systems and methods of monitoring the integrity of computer systems.

2. Related Background Art

Security of computer systems has long been an issue, and with the advent of the Internet, computer systems have become generally more exposed than ever to unauthorized access. Accordingly, technology addressing computer security is more important and diverse than ever. There are a number of technologies that address prevention of unauthorized access into computer systems. These technologies include widespread and advanced use of passwords and use of biometric identifiers such as voice recognition, retinal scanning and fingerprint recognition.

BRIEF DESCRIPTION OF THE DRAWINGS

The accompanying drawings, which are incorporated in and constitute a part of the specification, illustrate a present embodiment of the invention, and, together with the general description given above and the detailed description of the embodiments given below, serve to explain the principles of the invention.

Figure 22M:
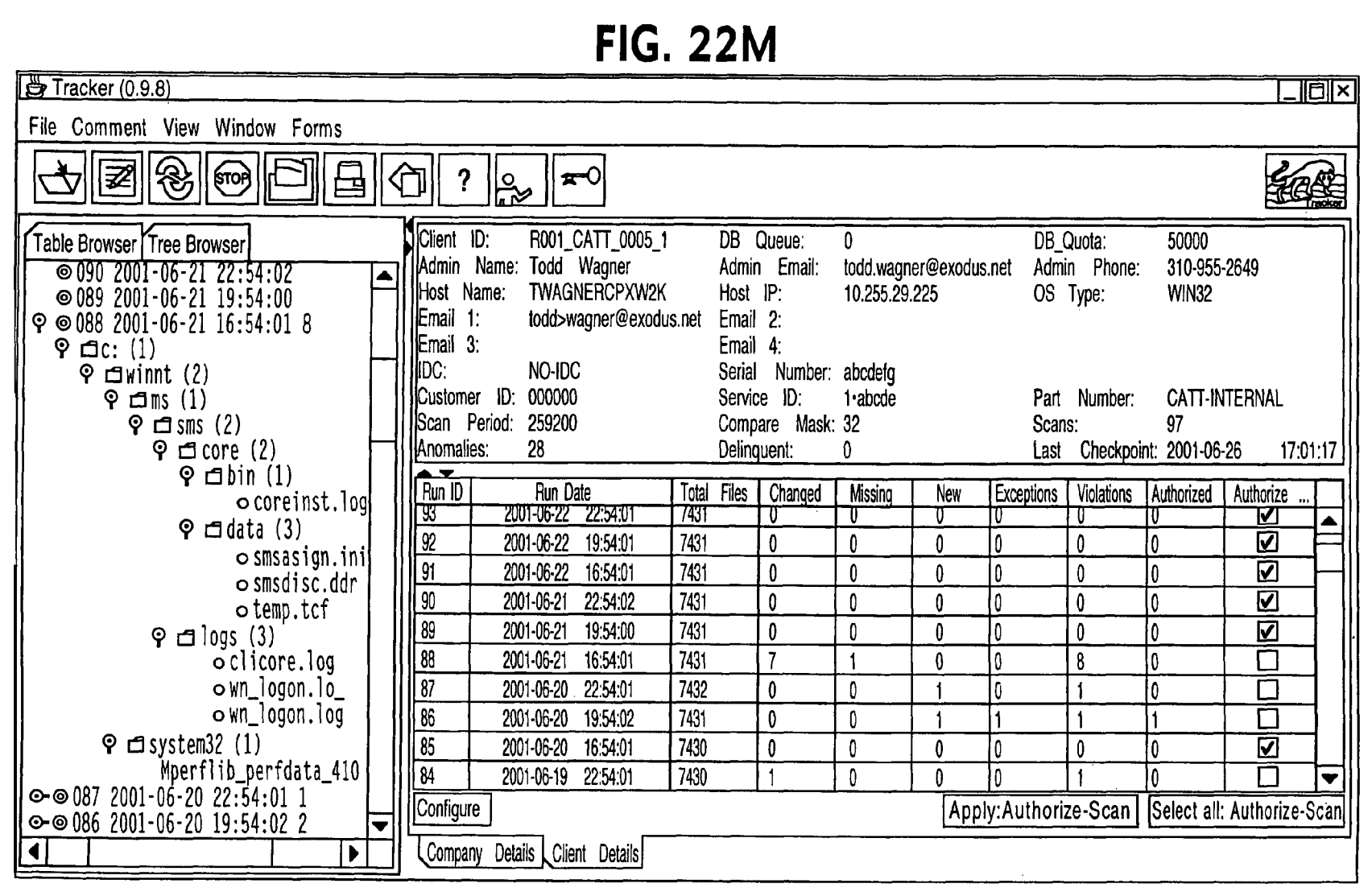

FIGS. 22A-22M are examples of various screen displays produced in accordance with embodiments of the present invention.

DETAILED DESCRIPTION

Figure 1:
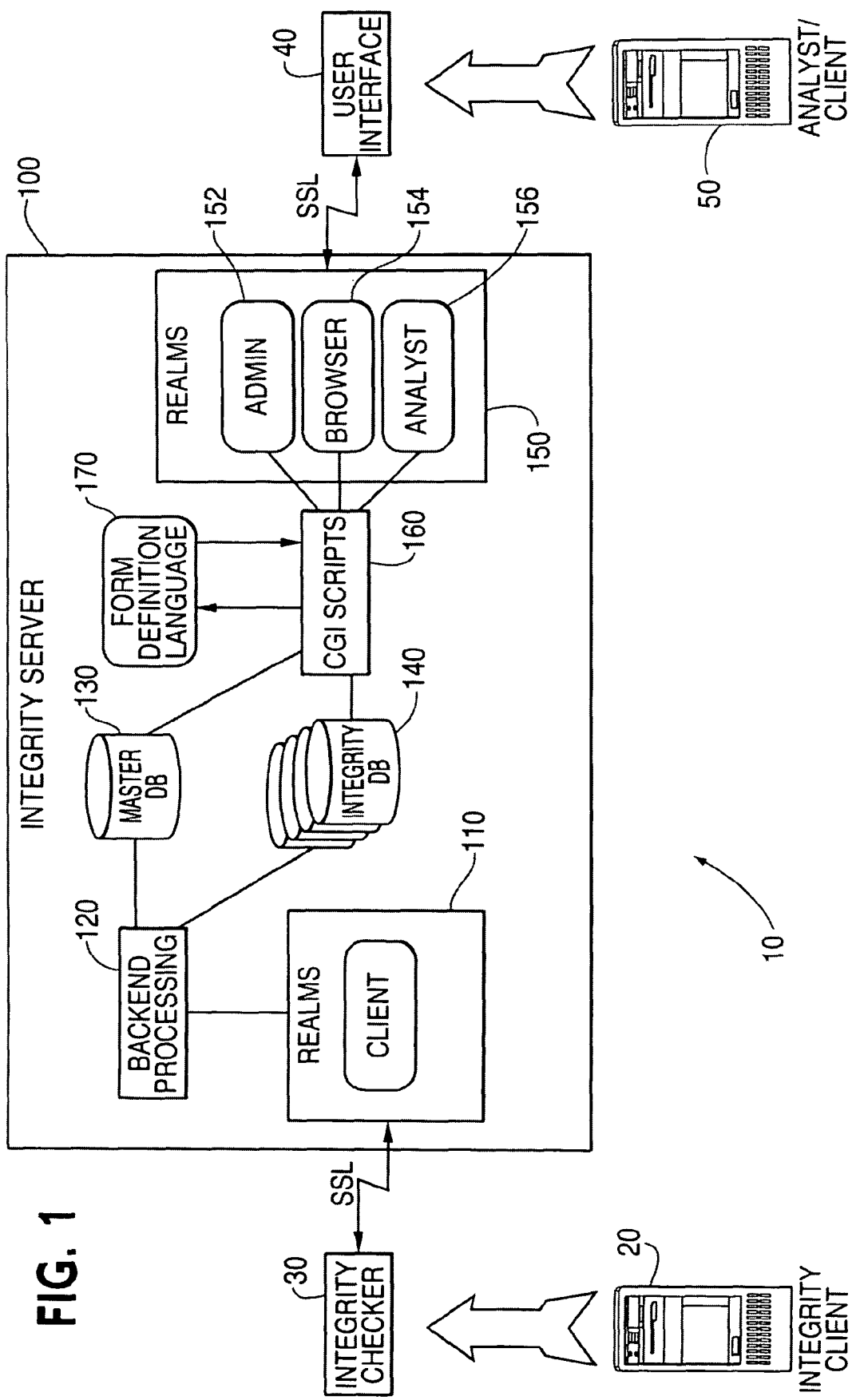
FIG. 1 is a block diagram is a block diagram showing an architecture of an integrity monitoring system in accordance with embodiments of the present invention.

Reference will now be made in detail to present embodiments of the invention, an example of which is illustrated in the accompanying drawings. Wherever possible, the same reference numerals will be used to designate the same or similar parts.

As described herein with reference to the accompanying drawings, the present invention provides methods, systems and software products for integrity monitoring of computer systems.

With use of security technologies, unauthorized access of computer systems still occurs. In the absence of complete isolation and total security of a computer system, the issues become:

whether an unauthorized access occurred;

whether, and what, unauthorized information was accessed;

whether any damage was done; and whether any damage will be done by further authorized access.

When computers and computer systems are accessed in an unauthorized manner, the state of various files will likely change, indicating a possible compromise of the systems. Upon unauthorized access, some changes to the computer system are obvious and therefore readily detectable, such as file changes that would deface a web site. However, other modifications to the system may be very hard to detect, yet they are likely to pose a greater threat to a computer system's security. For example, a system service that was "Trojanized"—i.e., infected with a computer virus that provides a hidden back-door to the system—is in more potential danger than a system which had a web page modified. Accordingly, a computer integrity monitoring system according to embodiments of the present invention is able accurately to monitor changes in the components of a computer system and to record both the checks that were performed by the integrity monitoring system and the changes that were detected.

Additionally an integrity monitoring system according to embodiments of the present invention may check a computer system and record the checks and changes on a periodic basis. Less than a twelve hour period is desirable and, for many critical systems, such as critical web hosting systems, less than a one hour period is preferable. Since many computer systems contain a large amount of data, and critical changes to such systems can be relatively small, such checks may generate a relatively large amount of relatively detailed data.

Accordingly, for such a system to be useful, the present invention also provides mechanisms for a human operator be able to review the data. According to aspects of the present invention, large amounts of collected data may be organized and presented in a manner that is easy and-efficient to review and that allows an operator to easily recognize when important system parameters have been accessed and/or altered.

Integrity Monitoring Function

The integrity monitoring function of an embodiment of the present invention watches over the files and directories that define an underlying computer system or systems. Computer systems, as used herein, includes, without limitation, stand alone computers, and/or computers that are attached to a network such as a local area network (LAN), wide area network (WAN) or the Internet, or all or part of the client and server computers that form a network such as a LAN, WAN or the Internet. Files monitored can include, without limitation, any and all data files including application files, system files, utility files, data files, and files which make up the contents and function of an Internet web site. The term data files also refers to collections of such files, whether in the form of a directory or in any other collection of data files. When monitored files or directories change, an alert message may be generated, and sent to designated recipients.

FIG. 1 is a block diagram showing an architecture of an integrity monitoring ("IM") system 10 according to embodiments of the present invention. An IM system 10, according to embodiments of the present invention, includes an integrity client 20, where files and directories are being monitored. Integrity client 20 may be running integrity checker 30 which may be software or hardware. The integrity checker 30 may be resident on a server separate from integrity client 20 and run on integrity client 20 over a network. IM system 10 also includes integrity server 100 which is interconnected with integrity checker 30 running on integrity client 20. This interconnection may be provided in a secure manner, for example, by a secure sockets layer ("SSL") network connection. Integrity server 100 will be discussed in greater detail below.

The IM system 10 also includes analyst client 50 which may be used by an analyst to monitor the state of integrity client 20. Analyst client 50 may be running user interface ("UI") 40, which may be software or hardware, that retrieves and manipulates integrity information from integrity server 100 and renders the integrity information in some manner on analyst client 50 (for example, displays such integrity information on a screen, print or other graphical interface (not shown) of analyst client 50). Analyst client 50 may be interconnected to integrity server 100 in a secure manner, for example, via an SSL network connection.

Integrity Checker

At the onset of the integrity monitoring service, a baseline is obtained of the computer system (for example, integrity client 20) to be monitored with integrity checker 30. Integrity checker 30 collects data from designated files and may post it to an integrity server 100 for safe keeping and subsequent analysis. On a regular basis, the integrity checker 30 posts snapshots of the computer system (for example, integrity client 20) to the integrity server 100, where they are compared and analyzed.

The integrity checker 30 may be configured to monitor various aspects of a computer system. For example, an integrity checker 30 according to the present invention may be used to monitor/check any or all of the following:

Integrity Monitoring
1. Entire Systems
2. Web Content
3. Critical System Files
4. Multiple Profiles
5. Trends and Metrics Evidence Collection
1. Live Systems
2. Imaged-Systems
3. Remote Systems Computer Forensics
1. Hidden Directories
2. Trojaned Executables
3. Time Stamp Analysis
4. String Searches
5. Database of Virgin Systems Computer Security Research and Analysis
1. Time Stamp Analysis
2. Inode Analysis Administration
1. Backup/Restore Validation
2. Software Installation/Removal An Integrity Monitoring system 10 in accordance with the present invention can monitor entire computer systems, web content of one or more web sites, and provide proactive feedback to a user concerning the state of such computer systems or web sites.

Integrity Monitoring, can be approached by creating multiple profiles that can independently monitor different and/or overlapping parts of a computer system. For example, two profiles could be defined: one that checks all critical system files every 15 minutes, and another that baselines the whole system on a longer time frame, for example, each night. This has the benefit that the load imposed by integrity checker 30 on a subject computer system such as integrity client 20 is minimal during the day when productivity requirements may be at their peak.

An integrity checker, such as integrity checker 30, in accordance with the present invention, provides a system baseline and evidence collection tool. A primary purpose of the integrity checker is to gather and/or develop information about specified files and directories in a forensically sound manner. Without limitation, the following information can be collected or derived: file meta data (i.e., attributes), cryptographic signatures (i.e., MIDS digests) of file/directory content, and file type. The integrity checker also has the ability to search for specified HEX/ASCII patterns such as those unique to a particular Trojaned binary or virus.

Data developed by the integrity checker is written to delimited text files so that it may be easily manipulated and analyzed by a wide variety of existing tools. In particular, the integrity checker's output is directly compatible with conventional relational database technology.

Preserving records of all activity that occurs during a baseline or snapshot is important for forensic analysis. For this reason, an integrity checker in accordance with the present invention can, without limitation, log at least four types of runtime information:
- configuration settings
- progress indicators (milestones),
- error messages
- execution metrics.

An integrity checker in accordance with embodiments of the present invention, such as integrity checker 30, includes the following advantages:
- utilization of a simple yet effective algorithm that can be applied equally well to different operating systems;
- generation of output that is compatible with off-the-shelf database technology;
- built-in logging that is complete, precise, and useful for analysis purposes, is minimally invasive to the target system; does not need to be installed on the target system (i.e., it is small enough to run from floppy diskette even if statically compiled); and
- has no user interface other-than-what is provided by the shell.

Other embodiments of an integrity checker in accordance with the present invention include the following attributes:
- The integrity checker can be deployed as an enterprise solution with all information being transmitted to and preserved on a hardened Integrity Server 100. This allows for centralized management of data, and avoids the problem of leaving data exposed on a client's system. Data stored on a client's system can be vulnerable to malicious modification or destruction.
- The integrity checker natively supports client initiated HTTP/HTTPS uploads. This can eliminate the need for boundary devices such as firewalls to have a special inbound connection rules.
- The output of the integrity checker is configurable on a per attribute basis which allows users to develop data in a way that's best suited to their needs.
- Embodiments of the integrity checker can produce directory hashes which provide a significant analysis advantage in situations where content rarely changes. The advantage is that one hash effectively represents all content in a particular directory.
- Embodiments of the integrity checker can perform file typing. When there are hundreds or thousands of unknown files, it is difficult to determine which files may have changed as a result of one or more malicious acts. In these situations, one can use type information to categorize files and prioritize the order in which they are examined.
- The integrity checker preferably has an extremely fast, built-in compare capability. This gives a user the ability to determine what files have changed, are new, or are missing by comparing two snapshots.

As noted above, integrity checker 30 provides integrity information about integrity client 20 to integrity server 100 via a secure connection (such as an SSL connection to integrity server 100). Integrity server 100 can be accessed by a plurality of integrity clients 20. Accordingly, upon accessing integrity server 100, integrity checker 30 accesses a realms module 110 of integrity server 100. Realms module 10 allows integrity checker 30 to identify which integrity client 20 the integrity checker 30 is providing data about.

Backend processing 120 of integrity server 100 then queries master database ("Master DB") 130 to determine where to store the data provided by integrity checker 30. As shown in FIG. 1, integrity server 100 may include multiple integrity databases (collectively "Integrity DB") 140. Each integrity DB 140 stores integrity data from a single integrity client 20. While shown in the drawing as separate databases, the Master DB 130 and some or all of the Integrity databases 140 may be stored on the same physical device or devices. Master DB 130 acts as an index to the location of data for different integrity clients 20 in integrity DB 140. After backend processing 120 queries master DB 130, master DB 130 returns the-location of integrity DB 140 which corresponds to the integrity client data being provided. Backend processing then stores the data in the appropriate integrity DB 140.

User Interface

The User Interface ("UI") 40 is a user interface which allows an analyst (computer software and/or human) using analyst client 50 to browse the integrity database 140. UI 40 provides security analysts and system administrators with account management capabilities. UI 40 has a number of capabilities, some of which are user configurable, that facilitate manipulating and navigating a potentially large set of data. Such capabilities include sorting, filtering, color coding, and providing a plurality of data views such as hierarchical data trees, tables, text areas, and comparison tables. UI 40 also provides a flexible, integrated, ad hoc database query interface. UI 40 includes multi-layered "plug-in" functionality that is based on a user's role. Each plug-in may have a function with-an associated role. As further explained below, users are identified by role at system sign on and are given access to only those functions appropriate for their role. Without limitation, some of the plug-in functions are:
- Authentication: Responsible for blocking/granting access to the role-based plug-in functions. The authentication component validates a user's role against a database of user account information.
- Print: Creates and prints multiple view components. This function is discussed further in the "Printing" section below.
- Data Export: Exports selected pre-formatted data results (for example, Excel, and various text formats).
- Ad Hoc Query Form: Provides an interface for querying the database directly and displaying results. Results are viewed using UI table view components.
- User Account Form: Creates and modifies user accounts.
- Client Account Form: Creates and modifies client accounts. Client accounts define the parameters and operating environment for a customer account.
- Save and Edit Properties: Maintains state on all user-configurable settings throughout a session. This includes hide/show of fields, table column widths and positions, colors, and session level settings. These settings can be directly manipulated via a property editor. The session properties can be saved to the client's machine and applied to subsequent sessions.
- File Exceptions: Defines filters for alert data.

As noted above, UI 40 requests information from integrity server 100 via a secure connection such as an SSL network connection. Also as noted above, UI 40 can access integrity server 100 under one of a plurality of roles. Accordingly, as shown in FIG. 1, upon accessing integrity server 100, a realms module 150 of integrity server 100 determines under which role UI 40 is accessing integrity server 100. As shown, realms module 150 determines whether UI 40 is accessing integrity server 100 as an administrator 152, a browser 154 or an analyst 156. As noted above, each role is assigned different functions and capabilities.

In some embodiments of the present invention, a data request from UI 40 is provided in mark-up language format which will be discussed in detail below. After determining user role, the data request is provided to common gateway interface ("CGI") scripts module 160. Based on the data request, CGI scripts module 160 accesses form definition language ("FDL") module 170 and constructs a database query using FDL from FDL module 170. CGI scripts module uses scripts and generates the scripts using a standard language such as, without limitation, JAVA or PERL. In some embodiments of the present invention the FDL used by FDL module 170 is a custom FDL and includes a number of novel features which are discussed in detail below.

FDL module 170 returns the constructed FDL query to CGI scripts module 160. CGI scripts module then queries master DB 130 to determine in which integrity DB the data regarding the integrity client being analyzed is stored. CGI scripts module 160 then forwards the FDL query to the appropriate integrity DB 140 and the requested data is returned to CGI scripts module 160. The data is returned to the CGI scripts module 160 in the FDL language used by FDL module 170. CGI scripts module 160 then returns this data to UI 40 which, as explained in detail below, parses the FDL and generates a display of the provided data based on the parsed FDL.

Operation of the Form Definition Language and the User Interface

The custom FDL of embodiments of the present invention drives the functionality of UI 40. The look and behavior of the data display provided by UI 40 are handled in a generic, data-driven way. This approach provides a dynamic environment for creating the display and the flexibility to accept data from any source. UI 40 receives FDL and data from a source, such as the integrity server 100. By interpreting the FDL, UI 40 dynamically creates views of the data. The look and the feel of the data views, and additional browsing functionality, are directed by the FDL. The design advantageously results in a highly portable browser applicable to any data set that can be described using the custom FDL.

Figure 2:
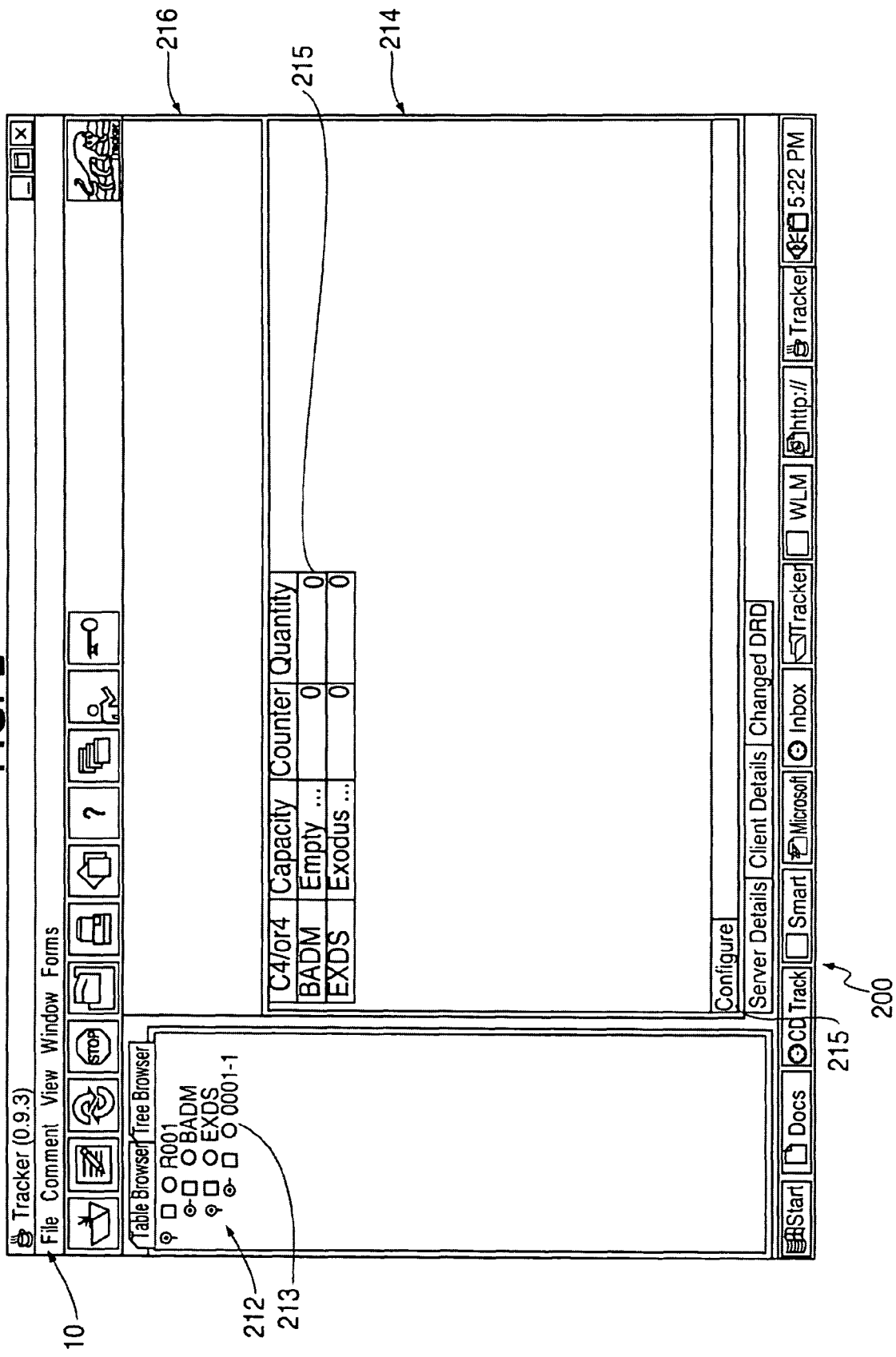
FIG. 2 is a screen display of a user interface of the integrity monitoring system shown in FIG. 1 showing an embodiment of a tree display and a table display.

FIG. 2 is a screen display illustrating a first data view 200 in an embodiment of a visualization tool in accordance with the present invention. First data view 200 includes a menu bar 210, a tree display 212, a table display 214 and an information display 216. Menu display 210 allows a user to select from a number of functions performed by UI 40. Tree display 212 identifies the integrity server 100 with which UI 40 is currently in communication. Tree display 212 also identifies the integrity client 20 about which analyst client 50 is currently obtaining information. In the example shown in FIG. 2, the integrity server is identified as "R001" in tree display 212 and the integrity client is identified as "0001". Table display 214 is displaying details about the integrity server labeled "R001". As shown, the table is displaying only four parameters for integrity server "R001". However, the configure button 215 allows a number of other parameters of integrity server "R001" to be displayed in table display 214 a group ID, a check time, and a file size, to name a few. Which parameters are displayed is user configurable. Information display 216 displays additional information about integrity server "R001" such as its name, Internet Protocol ("IP") address and email address, and the like.

Figure 3:
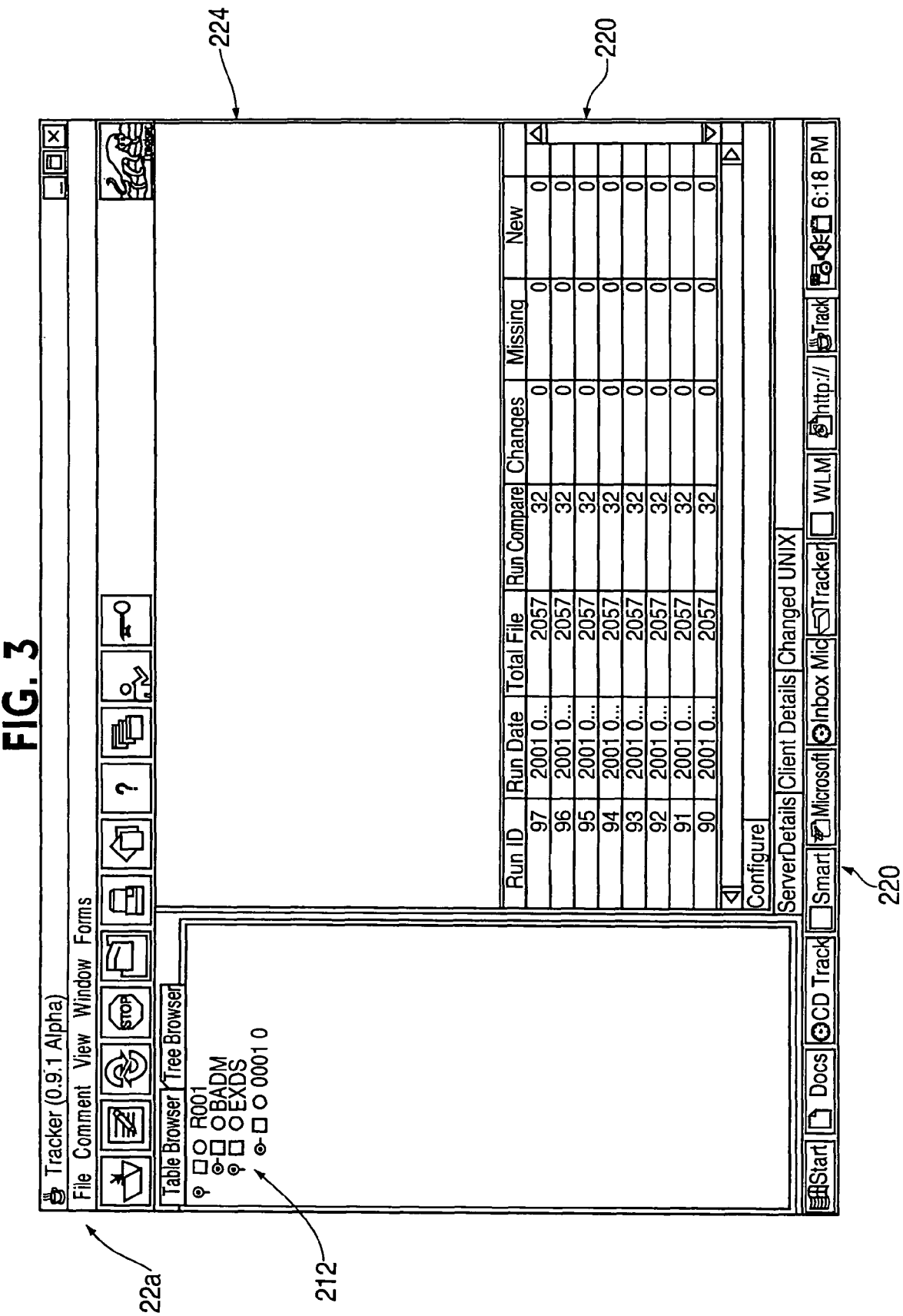
FIG. 3 is a screen display of a user interface of the integrity monitoring system shown in FIG. 1 showing the details of an embodiment of an information display.

In using UI 40 a user selects the integrity server to be accessed using the tree display 212. After selecting the appropriate integrity server, the user expands the tree display 212, as is understood by those skilled in the art, and selects the integrity client about which to retrieve data. FIG. 3 is a screen display illustrating a second data view 220 in an embodiment of a visualization tool in accordance with the present invention. Second data view 220 includes a menu bar 210, a tree display 212, a table display 222 and an information display 224. As shown in tree display 212 by the highlighted state of the "0001" branch of tree display 212, information about the integrity client identified as "0001" is being displayed in table display 222 and information display 224.

Table display 222 includes information such as the date and time an integrity check was performed on the selected integrity client (which is, as shown in FIG. 3, integrity client "0001") the run ID of the check performed at a given time and date, the total files checked during a giving check, the number of new files, the number of missing files and the number of changed files. Other information can also be displayed by table display 222. Information display 224 includes information about the integrity client shown in tree view 212 (as shown in FIG. 3 integrity client "0001"). Such information can include the client ID, the client e-mail address, the client IP address, a customer ID, and an administrator name, and other information. Information display 224 can also include other information about the displayed integrity client.

User Interface Instantiation and Authentication

Figure 4:
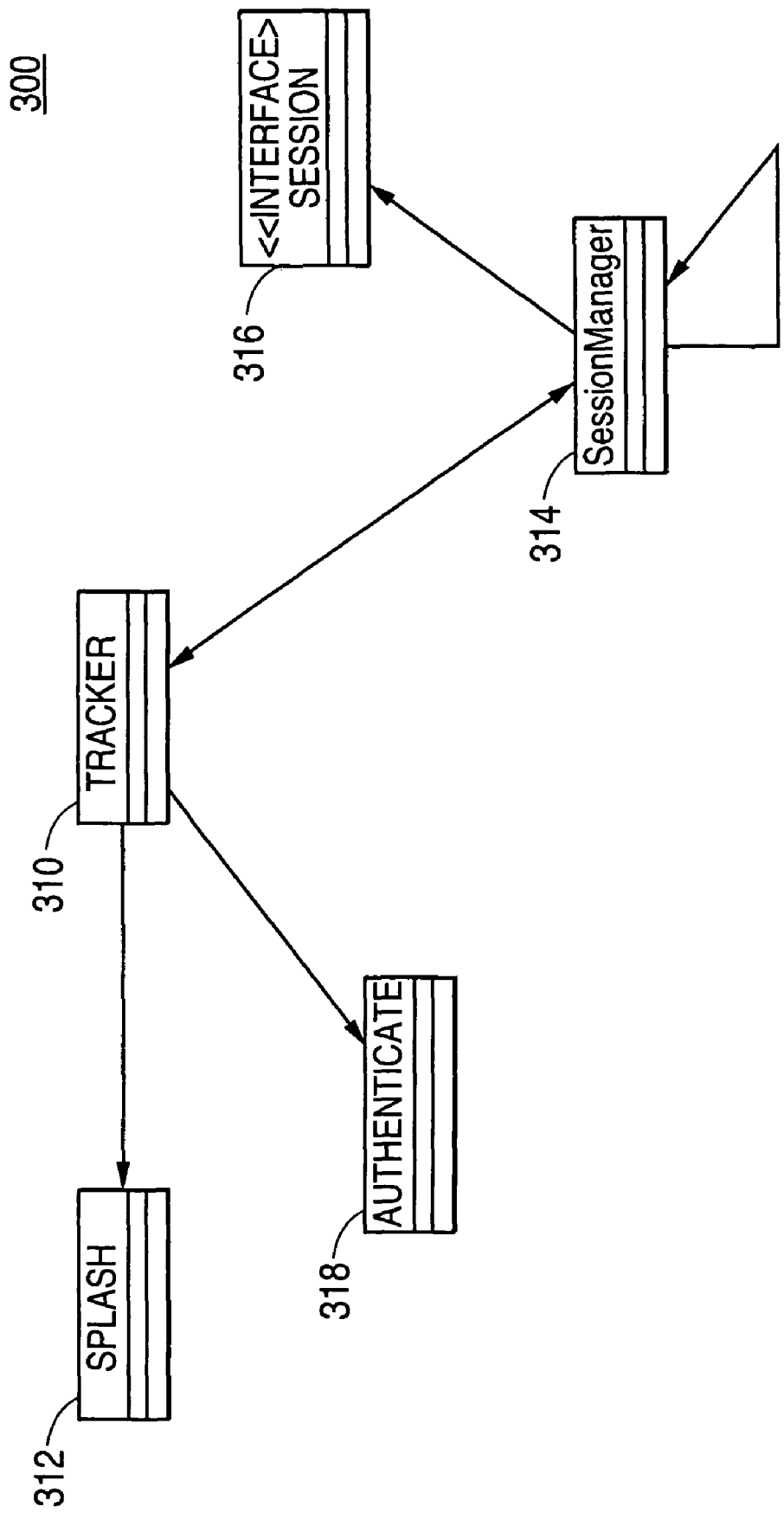
FIG. 4 is a block diagram illustrating a user interface instantiation and authentication system and method in accordance with embodiments of the present invention.

FIG. 4 is a block diagram showing instantiation and authentication system 300 of UI 40. Tracker module 310 is the main harness for UI 40 and starts UI 40 when called by a user of analyst client 50. Tracker module 310 displays screen splash 312 on a graphical interface (not shown) of analyst client 50 when UI 40 is started. Tracker 310 also initiates session manager 314 which controls all aspects of user session 316, which is discussed further below. Tracker 310 also starts authentication module 318 which authenticates a user's identity, as is well known by those skilled in the art.

Session Manager DataView Architecture

Figure 5:
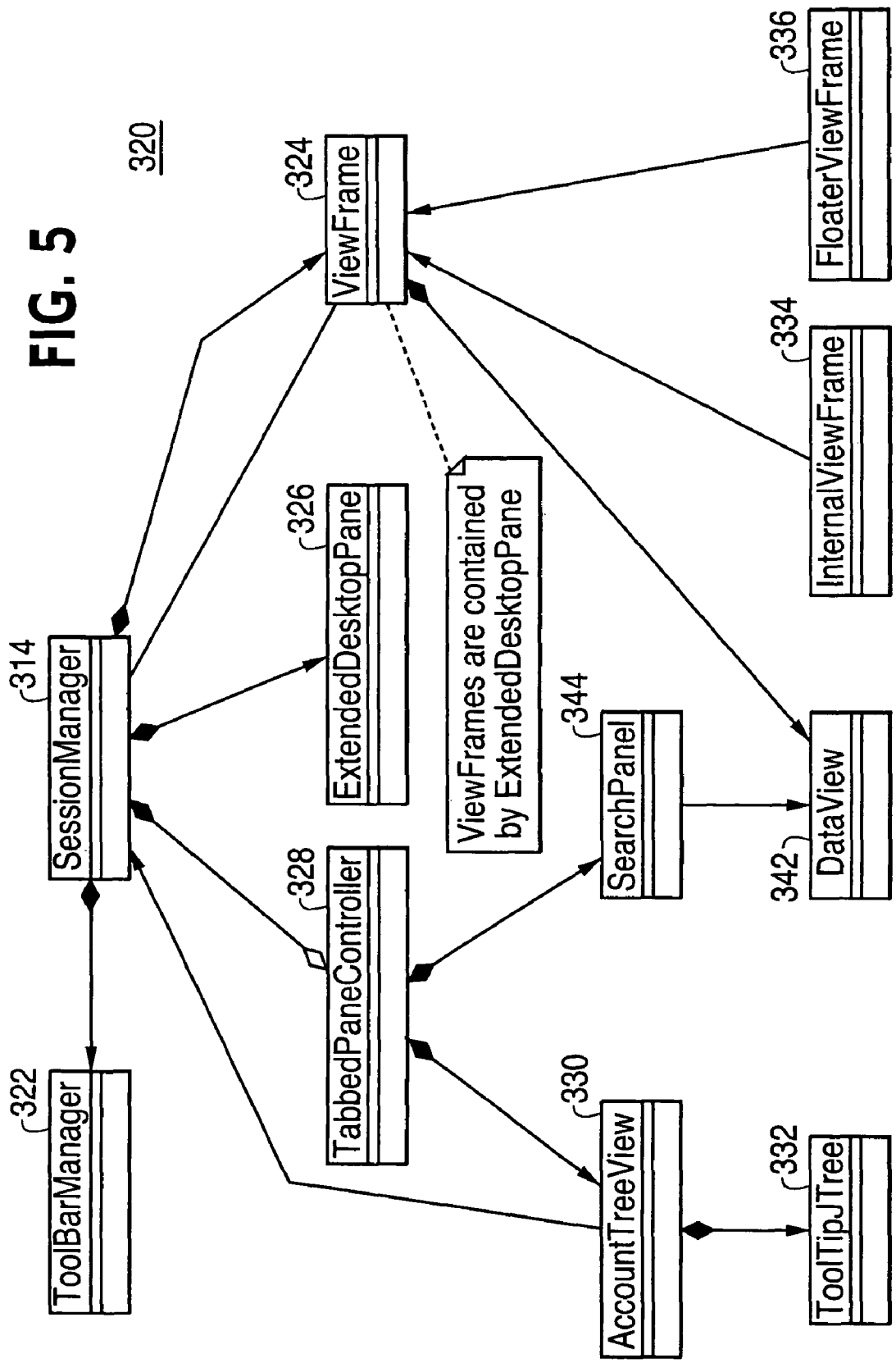
FIG. 5 is a block diagram illustrating a user interface data viewer management architecture in accordance with embodiments of the present invention.

FIG. 5 is a block diagram showing an embodiment of management of data view architecture 320 in accordance with the present invention. The session manager data view environment is a standard integrated development environment (IDE) well known to those skilled in the art. As noted above, session manager 314 performs overall management of all of the view components of UI 40.

Figure 6:
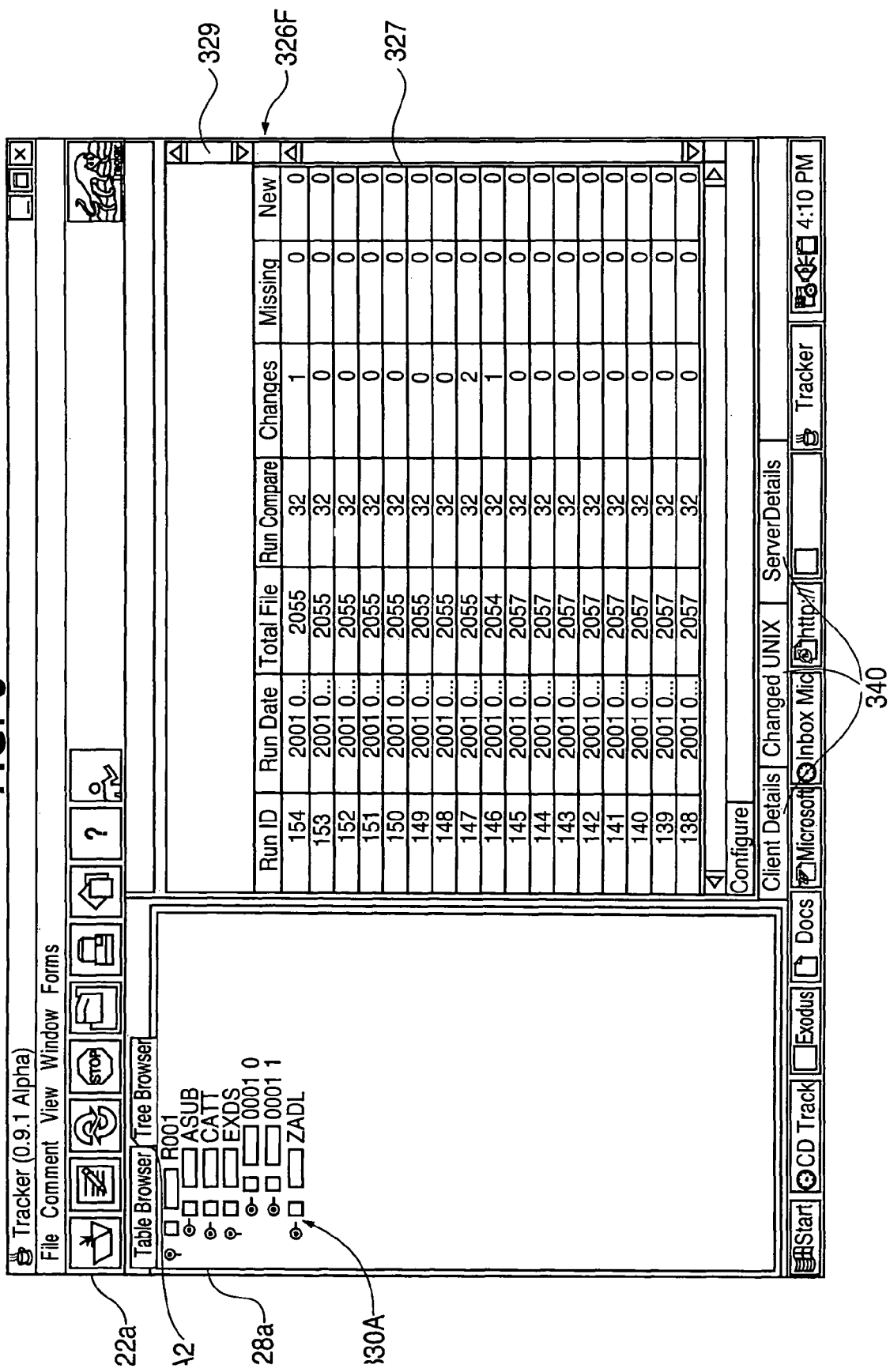
FIG. 6 is a screen display of a user interface illustrating tabs associated with hidden and shown tables in accordance with embodiments of the present invention.

FIG. 6 is a screen display illustrating selected view components of UI 40. Session manager 314 controls tool bar manager 322 which dictates the appearance of tool bar 322A shown in FIG. 6. Session manager 314 also controls view frame module 324, extended desktop pane 326, and tabbed pane controller 328. Tabbed pane controller 328 dictates the appearance of tabbed pane 328A of FIG. 6, which includes tree 330A controlled by account tree view module 330 of FIG. 5. Each branch of tree 330A has a tool tip (not shown) which provides information about the branch of the tree over which a pointing device is located. The appearance of these tool tips is controlled by tool tip module 332 shown in FIG. 5. Display and function of tool tips are well understood by those skilled in the art.

As shown in FIG. 6 desktop panel 326A includes a table display 327 and an information display 329. The appearance of Desktop panel 326A is controlled by extended desktop pane module 326, shown in FIG. 5. As noted in FIG. 5, extended desktop pane module 326 contains within it, view frame module 324 which, in turn, includes internal view frame module 334 and floater view frame module 336. Internal view frame module 334 controls the appearance of any additional displays appearing inside desktop panel 326A, other than table display 327 and information display 329. Such additional displays could include, for example, dialog boxes or additional table displays. Floater view frame module 336 controls any such additional displays appearing outside extended desktop 336A.

FIG. 6 shows tabs 342 in tabbed pane 328A and tabs 340 in desktop pane 326A. Data and view form information associated with tabs which view is currently hidden, that is, views hidden 'beneath' the displayed view, are contained in data view module 342 shown in FIG. 5. Accordingly, as shown in FIG. 5, data view module 342 can be accessed by both view frame module 324 and tabbed pane controller 328 (via search panel 344).

As discussed above, the interpretive nature of the custom FDL architecture allows UI 40 to make data-driven decisions on how to set up the display. A data display and integrity monitoring system in accordance with the present invention uses the FDL substantially as provided in attachment A to carry out a number of functions. The following are examples of such functions:

Dynamic Links

The data visualization tool of the present invention includes the ability to expand on information on various parts of the information display. For example, in FIG. 3, the entries of table display 222 of information display 220 can be links, so that by selecting one of the cells with a pointing tool, additional information is provided regarding the chosen entry. Entries in a data view which are links can be set apart from entries which are not links by highlighting the entries which are links such as by displaying the link data in a different color or font that the non-link data.

However, the type of data, that is; the fields, in tables displayed by UI 40, such as "Run Date", "Total Files", "Changed", "Missing", will vary from table to table and data contained in the same fields which two or more tables have in common will also vary. Accordingly, additional data associated with a link in a table will vary between tables and cells in a table. As such, the links contained in tables in a user interface in accordance with the present invention are dynamic, rather than static. In short, because the entries in the cells of a table display such as table display 222 are dynamic, and not static, any link to additional information provided by the entry in the table display must be dynamic; the information returned to and displayed by UI when a link in a table display is activated depends upon the particular data in the chosen cell of the table display. The specific data in a cell can depend upon a number of parameters including, but not limited to, the integrity client being analyzed, the time of the integrity check, and the parameter being examined.

Figure 7:
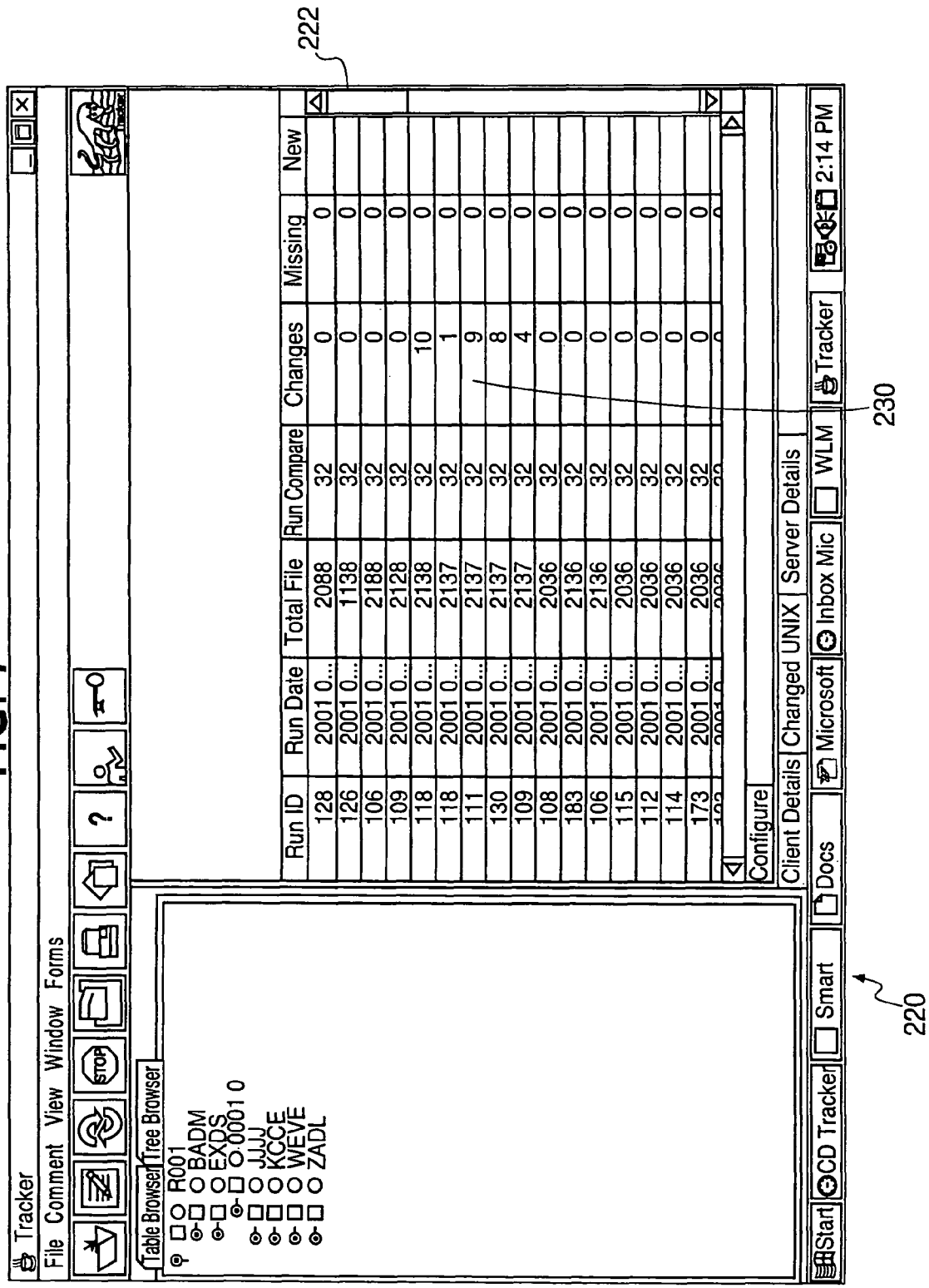
FIG. 7 is a screen display of a user interface illustrating table fields including dynamic links in accordance with embodiments of the present invention.

For example, as shown in FIG. 7, the table display 222 shows a highlighted cell 230 which is also a link. Highlighted cell 230 is associated with run ID number "112" (the first column of table display 222) and shows that three files have been changed on the integrity client from either a baseline integrity check or the last time the integrity check was run (run ID 111). To get additional information about the files changed and the changes themselves a user can activate this link.

Figure 8:
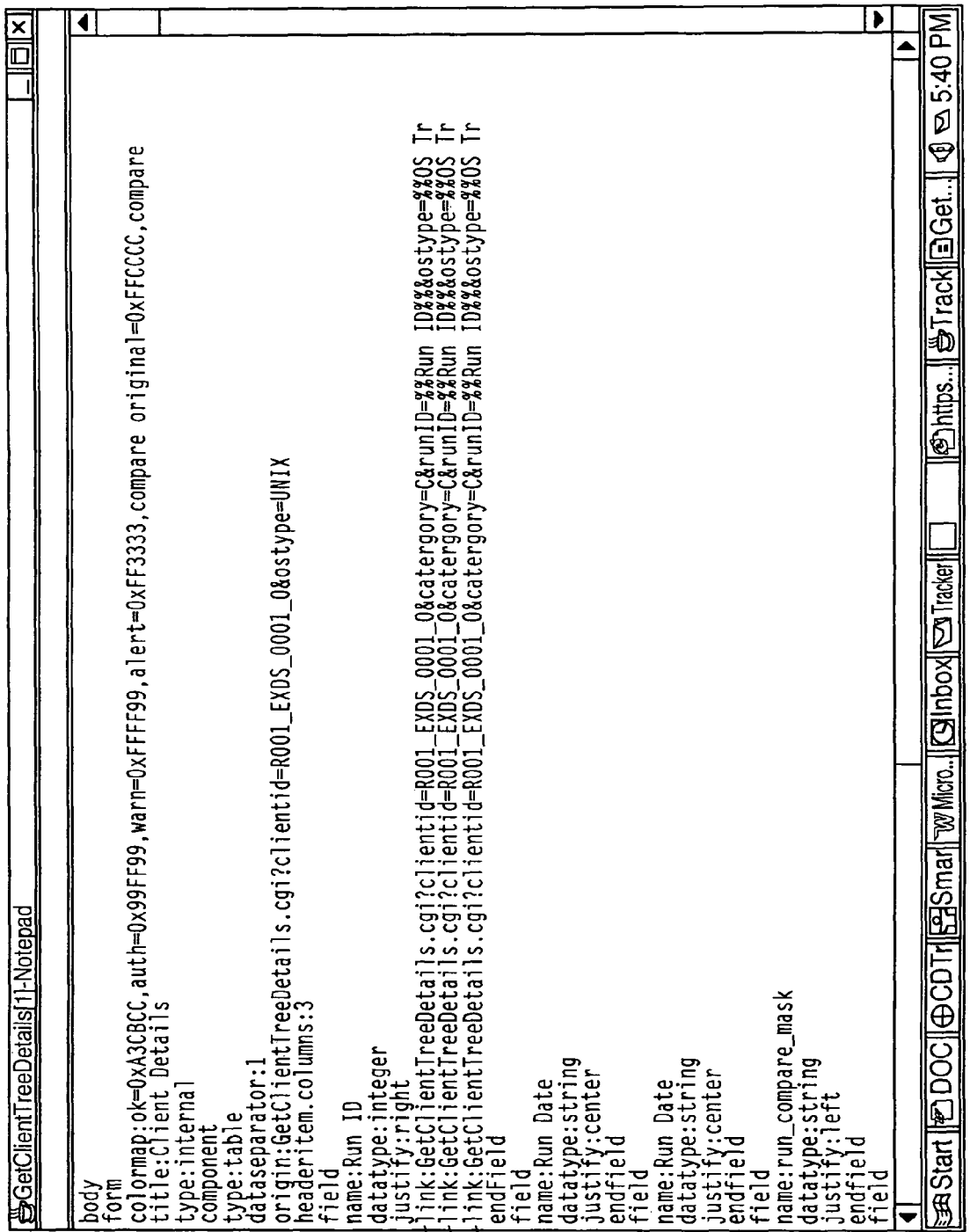
FIG. 8 is a screen display illustrating a data structure of dynamic links in accordance with embodiments of the present invention.

By activating this link, table data view module 380 substitutes specific information about the link activated into a link tag stored in UI 40, discussed further below, when display table 222 was generated by UI 40. An example of a generic link tag use to generate table 222 is shown in FIG. 8. The FDL code shown in FIG. 8 includes three link tags, 232, 234 and 236. The strings following the word "Link" in each line identify the data associated with the link tag. Each link tag 232, 234 and 236 may be associated with a column or field of table display 222 and includes identifying information regarding the particular integrity client about which information is desired.

Accommodating the dynamic nature of a link in accordance with the present invention, the link tag may contain a variable which must be filled in before appropriate information can be retrieved. The variables are, though not necessarily, delimited by a double ampersand ("&&"). Accordingly, each link tag 232, 234 and 236 includes in its argument the string: "%% Run ID %%". This is an example of a generic variable. To retrieve additional information about cell 230 of FIG. 7, the link tag associated with the "Changed" column of table display 222 is retrieved and the Run ID number is substituted in the "Run ID" variable location. UI 40 then includes this link tag in a Uniform Resource Locator ("URL") and transmits the URL to CGI scripts module 160.

The URL activates a CGI script which, as explained above, constructs a custom FDL query. The retrieved information returned to UI 40 where it is interpreted and displayed.

Figure 9:
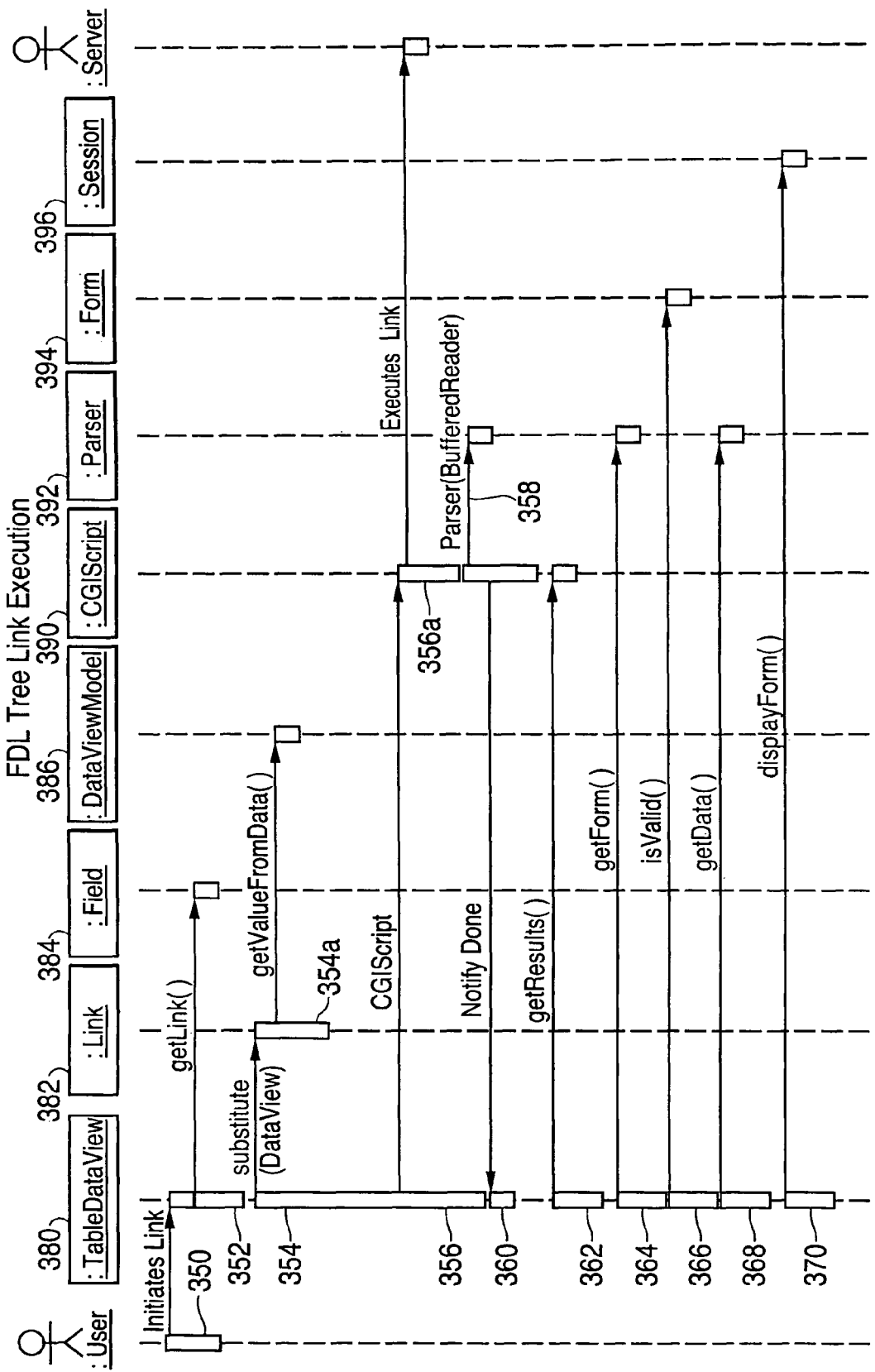
FIG. 9 is a sequence diagram illustrating a system and method for executing dynamic links in accordance with embodiments of the present invention.

FIG. 9 is a sequence diagram showing how UI 40 executes a dynamic link from a table display. Shown horizontally across the top of FIG. 9 are modules of UI 40 which perform a function or task in the table link execution process. The modules shown are, but not exclusively limited to, Table Data View 380, Link 382, Field 384, Data View Model 386, CGI Script 390, Parser 392, Form 394, and Session 396. Shown vertically in order from top to bottom of FIG. 9 are events that occur when executing the table link execution process.

At 350, a user of UI 40 initiates a link (for example, by clicking on the link with a pointing device such as a computer mouse) displayed on a graphical display (not shown) of analyst client 50 (shown in FIG. 1). By initiating a link, a user of analyst client 50 accesses table data view module 380, which manages the creation and display of tables and the table link execution process. At 352, table data view module 380 accesses field module 384, which contains information about in which field or column the activated link resides. For example, referring to FIG. 7, a link could be contained in the "changed" field of desktop panel 326a.

As discussed above, the dynamic link tag associated with the activated link includes variables for identifying the specific link activated. At 354, table data view module 380 provides the retrieved information about the initiated link to link module 382, which substitutes the specific information about which data is requested into the variable link information. The specific information about the requested data was stored in data view model module 386 when the table from which the link was executed was downloaded from the integrity server 100 (shown in FIG. 1). For example, referring again to FIG. 6, if the user has activated a link in the "changed" column of desktop panel 326a, field module 384 provides the column or field of this link, and data view model module associates this location information with the specific run ID number on which the changed data was collected. Accordingly, in 354a, link module accesses data view model module 386 and retrieves this data. Link module 382 then substitutes this data into the link information and provides it to table data view module 380.

At 356, table view module 380 provides the link information to CGI script module 390, which embeds the link information into a CGI script which is used to obtain the information about the specific link activated from integrity server 100. In 356a, CGI script module 390 generates a URL including the embedded link information and provides the URL to integrity server 100, which, as explained above, provides detailed information regarding the activated link back to CGI script module 390 in the form of FDL.

At 358, the returned FDL is provided to parser module 392 which parses the FDL to create the components of the object, such as fields of a table, which will be viewed by the user. Additionally, at 360, CGI script module 390 tells table data view module 382 that the requested information has been returned. Then, at 362, table data view temporarily "houses"

or "subsumes" parser module 392 from CGI scripts module 390 in order to fully extract the returned results.

At 364, table data view module 380 gets information about the form used to display the results from parser module 392. And, at 366, table data view module 380 checks with forms module 394 which contains generic structures for all valid forms to be sure the form information provided by parser module 392 describes a valid form. If the form is valid, then, at 368, table data view module 380 gets the data with which to fill in the obtained form from parser module 392. At 370, table data view 380 forwards the form and data to session module 396 which displays the provided information on the monitor of analyst client 50.

By allowing additional information about a given data entry to be retrieved from integrity server 100, which is external to UI 40, a user can view the data initially provided and advantageously obtain additional information only about data which the user wishes to obtain additional information about. A potentially overwhelming amount of additional information does not have to be initially displayed. This advantageously allows a user to browse data relatively quickly. Additionally, by storing the additional data external to UI 40, and providing data to UI 40 which allows the additional information to be generically describable by a variable, and completing the variable to construct a query to obtain the additional information, UI 40 does not need to have access to a relatively large amount of valuable memory. In addition, UI 40 can display a wide range of types and amounts of data and requires a relatively small amount of memory because the data does not need to be downloaded, or even specifically identified, on an initial download of more general data.

Difference Tables

Figure 10:
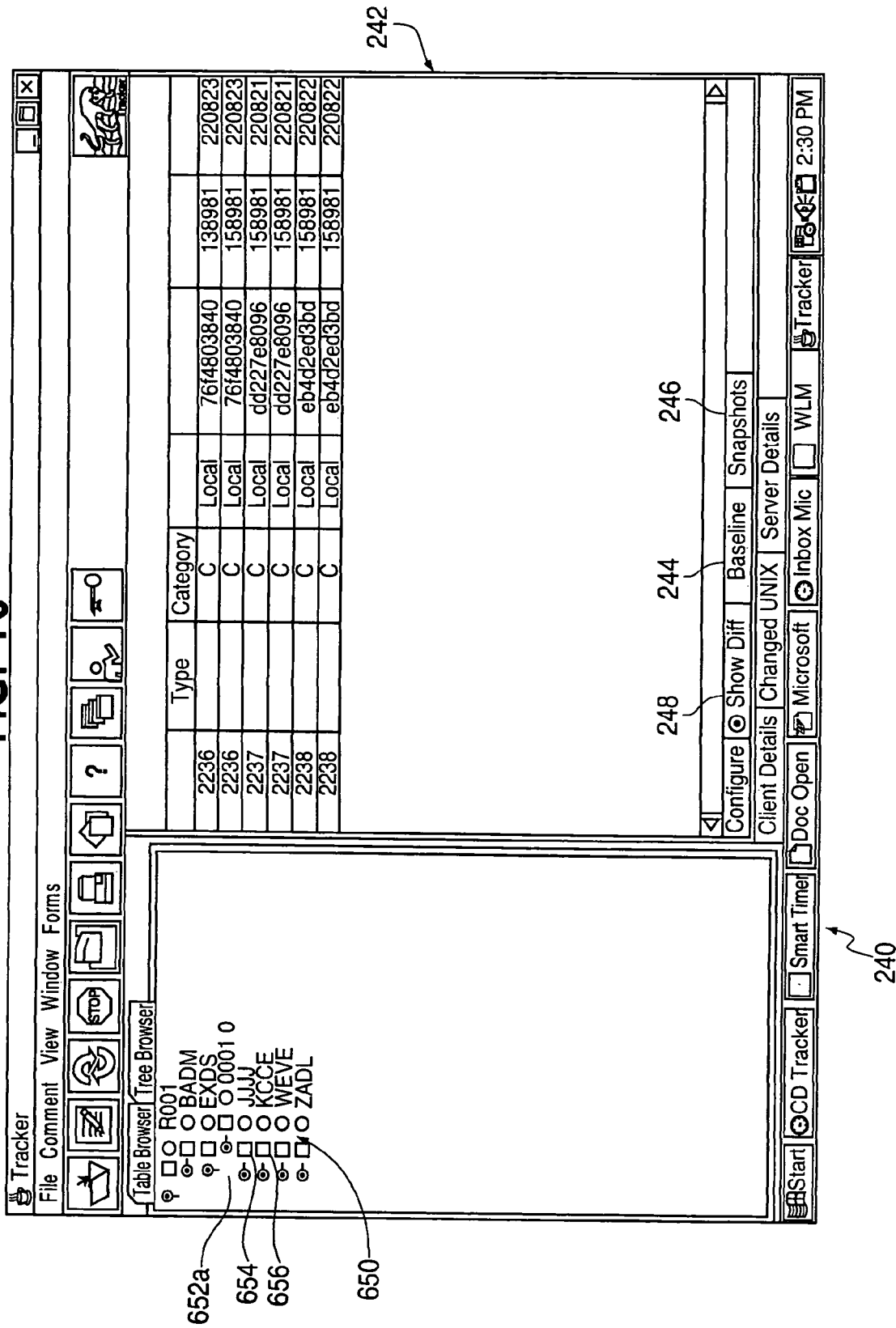
FIG. 10 is a screen display of a user interface in accordance with embodiments of the present invention showing an embodiment of a difference table.

After a link is activated, the data is retrieved from the integrity server 100 as explained above, and returned to UI 40. UI 40 then interprets the FDL and displays the data accordingly. FIG. 10 shows screen print 240 of UI 40 having a difference table display 242 which results from activating the link in cell 230 of screen print 220 shown in FIG. 4. Difference table display 242 shows the differences between a baseline integrity check and the integrity check selected by activating a link in table display 222. As shown in FIG. 6, difference table display 242 displays a number of parameters about the three changes in integrity client files detected during run ID "112". Such parameters include but are not limited to, name of the file changed, the type of the change, the name of the device, and the size of the file.

Table display 242 includes at least two background colors. A first background color 244 shows the baseline values of the parameters checked and a second background color 246 shows the values of the parameters checked during run ID "112". Additionally, activating button 248 labeled "Show Diffs" will show the changes in the values, on a digit-by-digit basis, of the parameters checked in a highlighted color, such as red. For example and without limitation, if a baseline file size was 120,000 bytes and after being changed, the file size was 12,450 bytes, the "450" of the changed file size would be displayed in the highlighted color such as red while the "12" of the changed file size would be displayed in a color other than red, such a black. In this way, the specific changes between the baseline values and checked values can advantageously be determined quickly and accurately.

Tree Link Execution

Figure 11:
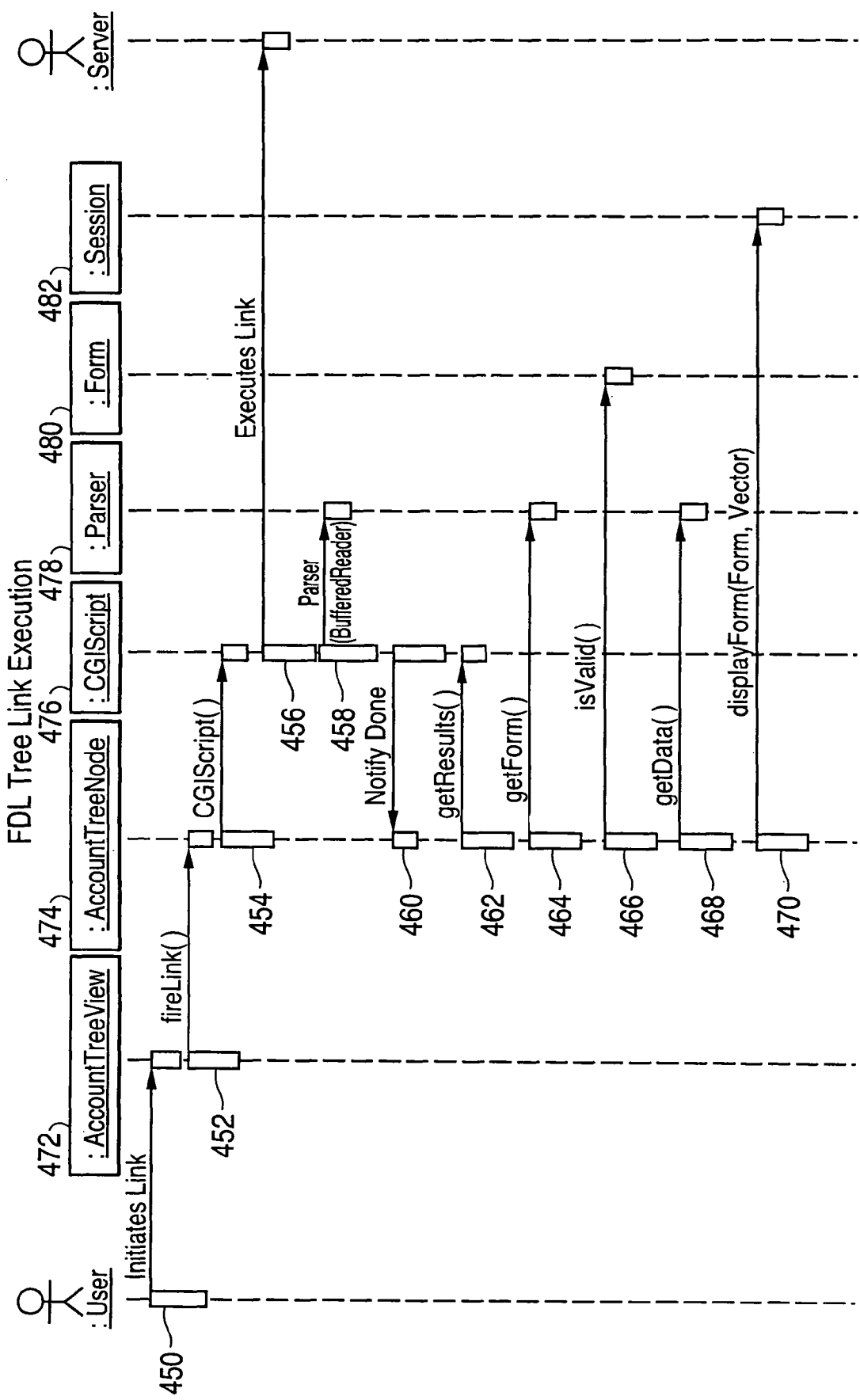
FIG. 11 is a sequence diagram illustrating a system and method for executing dynamic links from a tree display in accordance with embodiments of the present invention.

A user interface in accordance with the present invention will also allow a dynamic link to be activated from a tree branch of a tree display such as tree display 212 shown in FIG. 2. As with table link execution discussed above, executing a link from a tree display causes more information to be retrieved and displayed about the branch link which was activated. For example, referring again to FIG. 2, tree branch 213 is a link and the "0001" displayed on tree branch 213 indicates that by activating the link, additional information regarding integrity client 20 will be displayed. Accordingly, activating tree branch 213 causes table 215 to be displayed in table display 214. It is also considered that tables having configurations and data different from that of table 215 be displayed or other data forms be displayed when a branch link is activated. FIG. 11 is a sequence diagram showing one embodiment of a system and method for tree link execution in accordance with the present invention. At 450, a user of client analyst 50 activates a link, as discussed above, to expand a branch of a tree such as tree 212 shown in FIG. 2. This request is transferred from a user input (such as a pointing device) to account tree view module 472, which displays a tree on a graphical user display (not shown) of analyst client 50.

An account tree node module 474 is associated with each branch of a displayed tree. Account tree view 472 determines with which branch on the displayed tree the activated link is associated and, at 452, forwards the information that the link has been activated, or "fires" the link, to the appropriate account tree node module 474.

Account tree node module 474 manages the activation of the link for the branch with which it is associated. After receiving information that a link associated with its branch has been activated account tree node module 474 can complete a dynamic substitution process substantially the same as that described above with respect to table link execution. Specifically, tree node module 474 can retrieve specific data associated with the activated link to fill in arguments of generic link tag variables, as described above with respect to FIG. 9. At 454, the completed link tag, that is, the link tag with any variables filled in, is forwarded to CGI script module 476 which creates a URL embedded with the link tag information. At 456, the CGI script is provided to integrity server 100 (shown in FIG. 1) which returns the requested information in the form of FDL to CGI script module 476. At 458, CGI scripts module 476 provides the returned FDL to parser module 436, which parses the provided FDL to allow the appropriate form and content to be displayed.

At 460, CGI scripts module notifies account tree node module 474 that the requested information has been returned. At 462, account tree node module 474 temporarily subsumes the parser in order to extract the results of activating the link therefrom. At 464, account tree node module 474 gets form definition information from parser module 478 and at 466, checks with form module 480, which contains an index of appropriate form definitions to be sure the form definition received from parser module 478 is accurate. Then, if the form definition provided by parser module 478 is accurate, account tree node 474 retrieves from parser 478 the data to complete the form. At 470, account tree node module 474 provides the form and data information to session module 482 which renders the form and data on the graphical user interface of analyst client 50 (shown in FIG. 1).

Tree Expansion Links

Above was described a system and method in accordance with the present invention for dynamic linking from tables and trees. Dynamically linking on a tree display can also cause the tree to expand, showing additional data associated with the branch of the tree that included the activated link.

Figure 12:
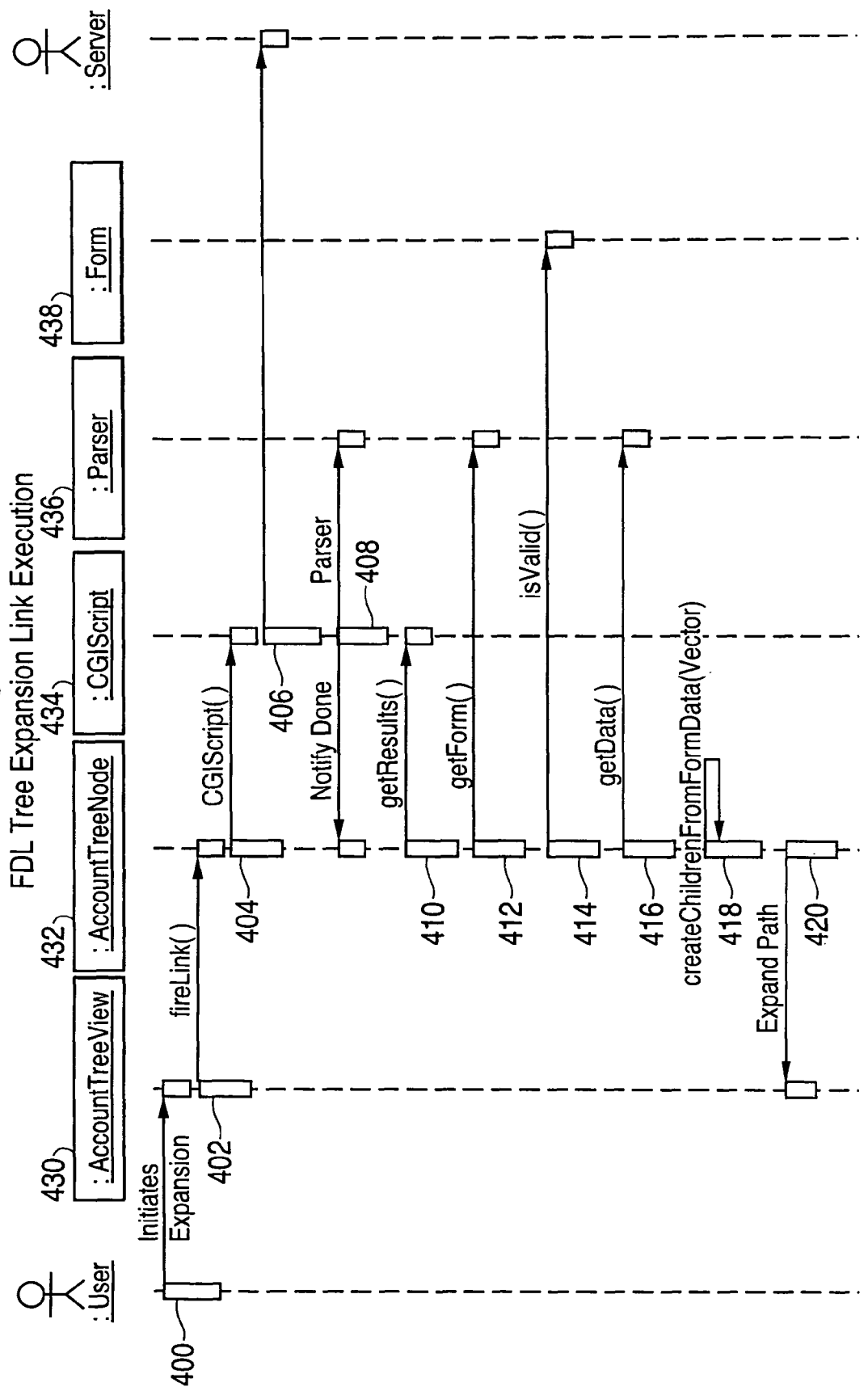
FIG. 12 is a sequence diagram illustrating a system and method for executing tree expansion links from a tree display is accordance with embodiments of the present invention

FIG. 12 is a sequence diagram illustrating an embodiment of a system and method for tree expansion link execution in accordance with the present invention. In 400, a user of client analyst computer 50 activates a link, as discussed above, to expand a branch of a tree such as tree display 330A shown in FIG. 6. This request is transferred from a user input (such as a pointing device) to account tree view module 430, which displays a tree on a display device (not shown) of analyst client computer 50.

An account tree node module 432 is associated with each branch of a displayed tree. Account tree view 430 determines which branch on the displayed tree with which the activated link is associated and, in 402, forwards the information that the link has been activated to the appropriate account tree node module 432. Account tree node module 432 manages the activation of the link for the branch with which it is associated. After receiving information that a link associated with its branch has been activated account tree node module 432 can complete a dynamic substitution process substantially the same as that described above with respect to table link execution. Specifically, tree node module 432 can retrieve specific data associated with the activated link to fill in arguments of generic link tag variables. In 404 the completed link tag is forwarded to CGI script module 434 which creates a URL embedded with the link tag information. In 406, the CGI script is provided to integrity server 100 (shown in FIG. 1) which returns the requested information in the form of FDL to CGI script module 434. In 408, CGI scripts module notifies account tree node module 432 that the requested information has been returned and provides the FDL to parser module 436, which parses the provided FDL to allow the appropriate form and content to be displayed.

In 410, account tree node module 410 temporarily takes control of parser module 436 to extract the returned, parsed information therefrom. In 412, account tree node module 432 gets form definition information from parser module 436 and in 414, checks with form module 438, which contains an index of appropriate form definition, to be sure the form definition received from parser module 436 is accurate. Then, if the form definition provided by parser module 436 is accurate, account tree node 432 retrieves from parser 436 the data to complete the form. In 418, account tree node module 432 creates the children from the provided data and in 420, provides the expanded tree branch data to account tree view module 430 to allow the user to view the expanded branch.

Figure 13:
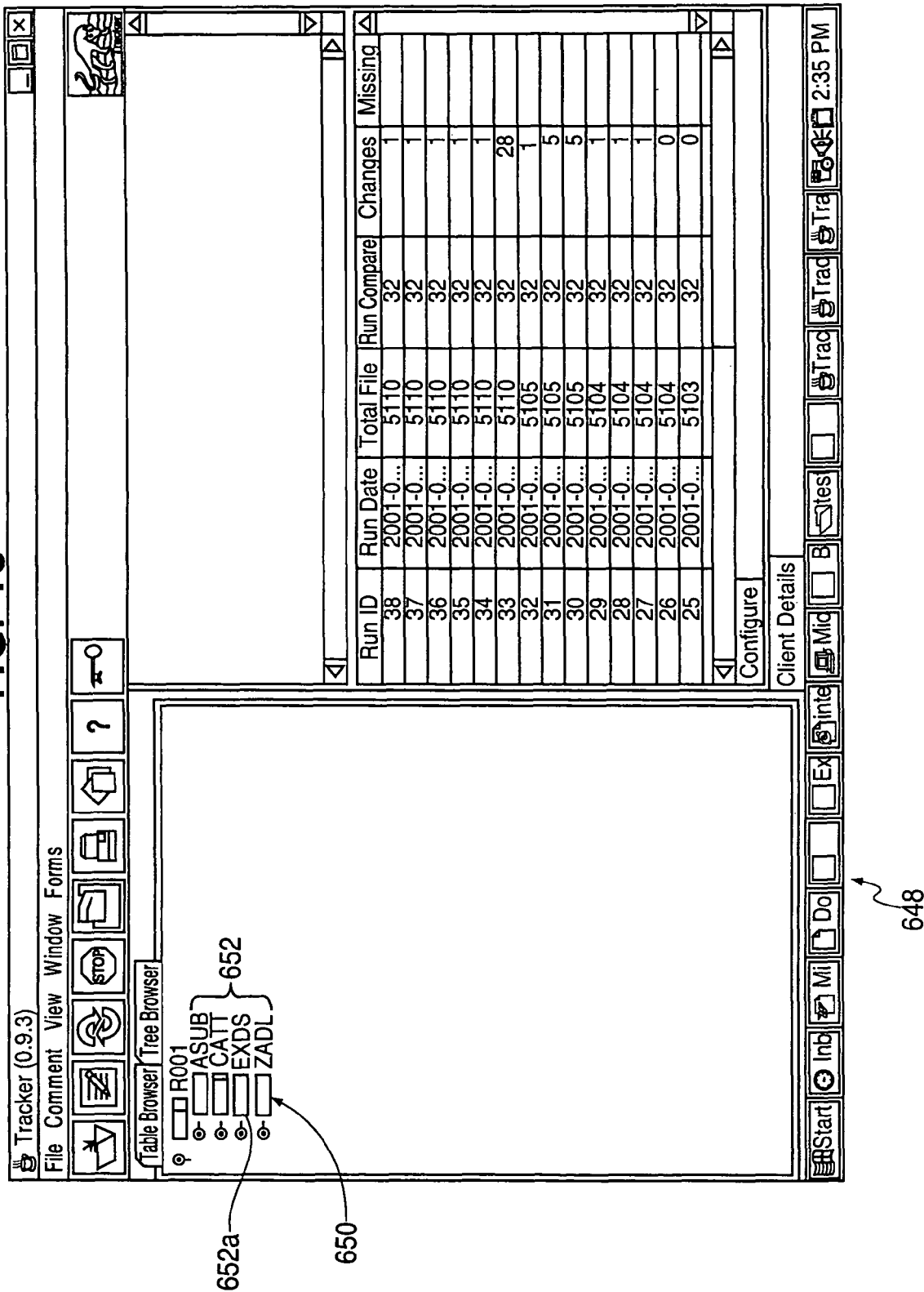
FIG. 13 is a screen display illustrating a user interface having expandable tree links in accordance with embodiments of the present invention.
Figure 14:
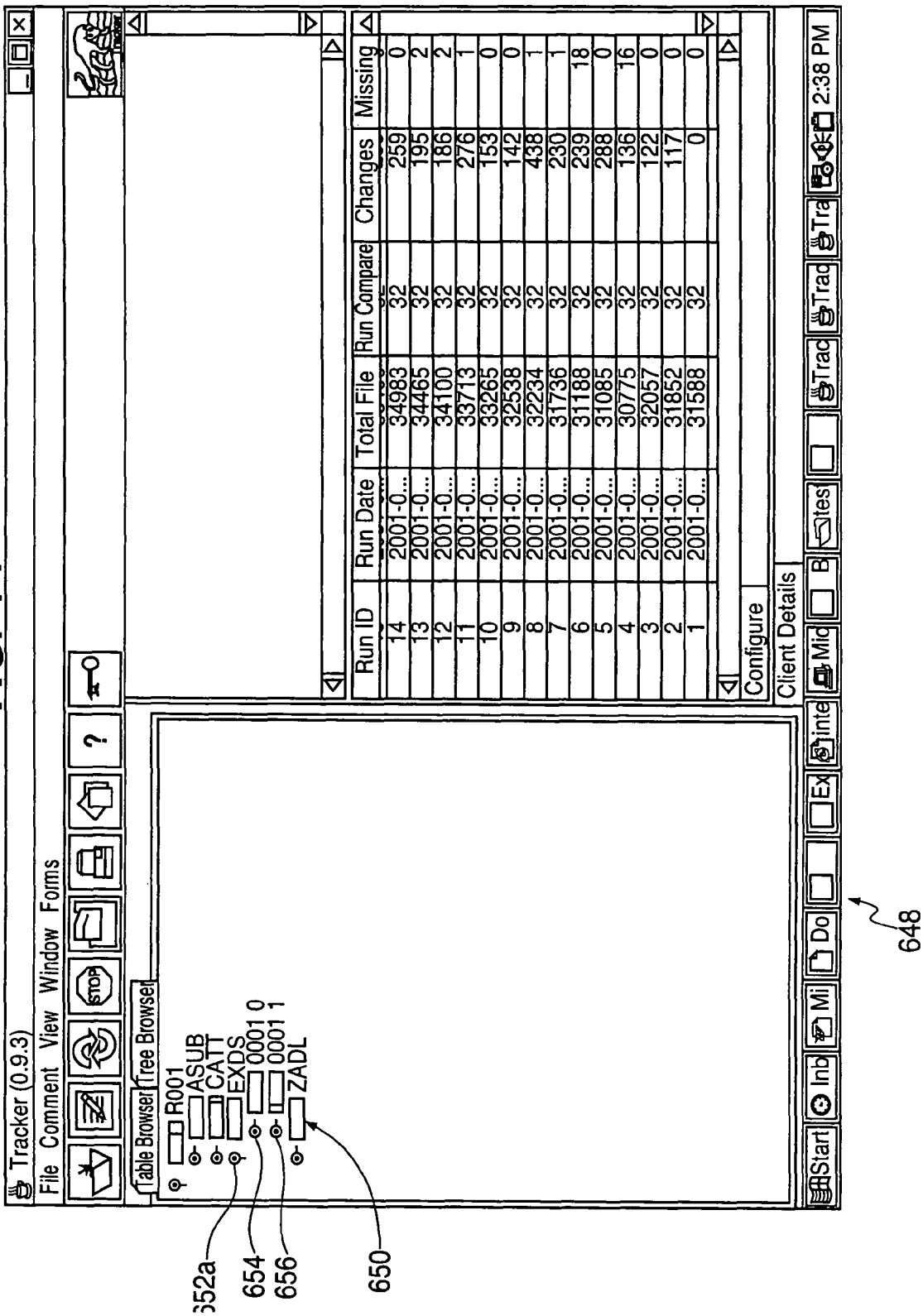
FIG. 14 is a screen display illustrating a user interface having expanded expandable tree links in accordance with embodiments of the present invention.

FIG. 13 illustrates a screen display 648 of UI 40. Screen display 648 includes a table display 650 showing that the integrity server to which UI 40 is currently attached is integrity server "R001" and that integrity server "R001" is monitoring four client systems 652 labeled "ASUB", "CATT", "EXDS" and "ZADL". Next to each client system 652 is an icon in the shape of a circle with a dot in the center and a small, horizontal line extending from the right side of the circle. The horizontal extending line indicates that additional information is available about the identified system, but is not currently displayed. To expand the tree, and display the additional information, a user activates the circle icon. As shown in FIG. 14, which is a second view of screen display 648 including table display 650, the table branch 652a (corresponding to the system labeled "EXDS") has been expanded as discussed above with respect to FIG. 12. As shown, there are two additional servers, identified by branches 654 and 656 and labeled "0001 0" and "0001 1". The icon adjacent to branch 652a is not a circle with a vertical line pointing down. This indicates that branch 652a has been expanded.

Rendering

As discussed above, the custom FDL of the present invention includes a number of features that allow for rendering of a view component, such as a table or tree which advantageously displays a large amount of information in a single view and in a manner that is easy to assimilate and user configurable. These features include constraints, categories and color tags, each of which is discussed in detail below.

Constraints

The custom FDL of the present invention has the capability to vary display characteristics based on the relationship between a displayed parameter value and a predetermined value. In this way, parameter values that are outside a predetermined range, or greater or less than a predetermined value, can be highlighted for a user of UI 40. Thus, values which may not be within expected constraints can be highlighted to advantageously allow a user of UI 40 to quickly determine whether an integrity client has been altered in a predetermined way.

To perform this function, the custom FDL includes a constraint tag "Constraint" which uses an integer as its argument. The constraint tag is used with a color tag "Colortag" to allow the color associated with a particular parameter value to be altered when the predetermined condition is met. The integer value in the argument of the constraint tag is the value above which the compared parameter value will be displayed in a highlighted format.

The color tag determines with which color the parameter value will highlighted when above the value in the constraint tag. It is also considered to highlight the selected parameter value in other ways, such as by using a different font, or causing the value to blink on and off. Additionally, it is considered that a value be highlighted when it is below a predetermined value or outside or inside a predetermined range of values.

Referring once again to FIG. 3 the row having Run ID number "94" shows an example of a constraint. Because one of the values of one of the parameters of run number "94" has a value above a value listed in a constraint tag for that parameter the row is highlighted by being displayed in a different color than adjacent rows.

Categories

UI 40 uses categories, established at runtime based on the data, to determine the look of tree nodes. To display a category, the "Category" tag is used. This tag groups fields under a common label. The argument of the "Category" tag is a string. The string provided will appear as a tree branch menu item for hiding/showing child tree nodes of that specific category.

For example, in an embodiment of the present invention, in a tree display when the child data of a parent branch includes different categories of data, the FDL returned for the tree by the CGI scripts module will include a "Category" tag for the child data. When this occurs, UI 40 adds a "categories" menu item to a menu display for the parent branch. When this categories menu item is selected, an icon is displayed next to a child branch which identifies the category to which the computer system associated with the child branch belongs. This icon is also defined by the FDL for the tree returned by the CGI scripts module when the tree was built.

Figure 15:
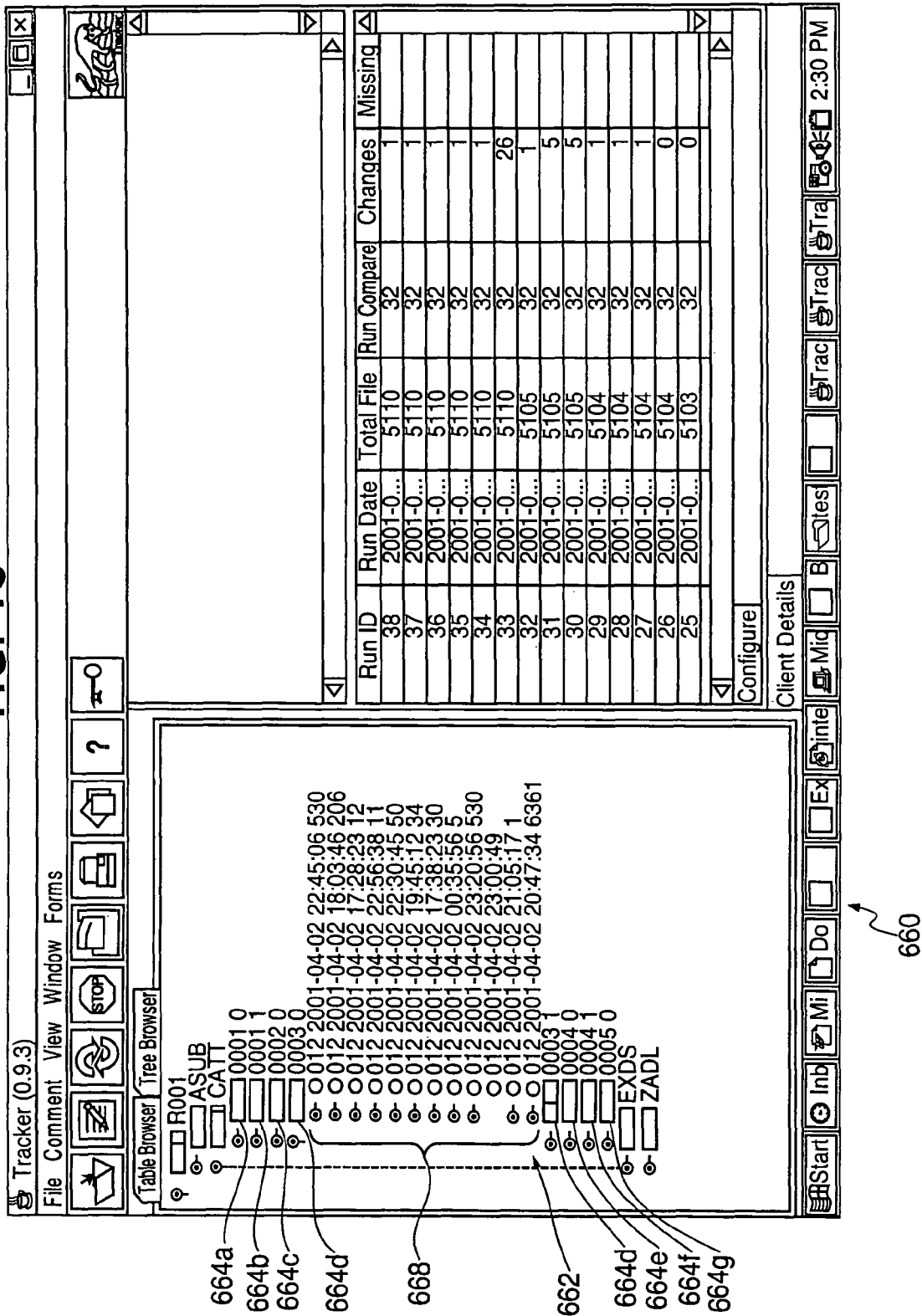
FIG. 15 is a screen display illustrating a user interface having branches associated with categories in accordance with embodiments of the present invention.
Figure 16:
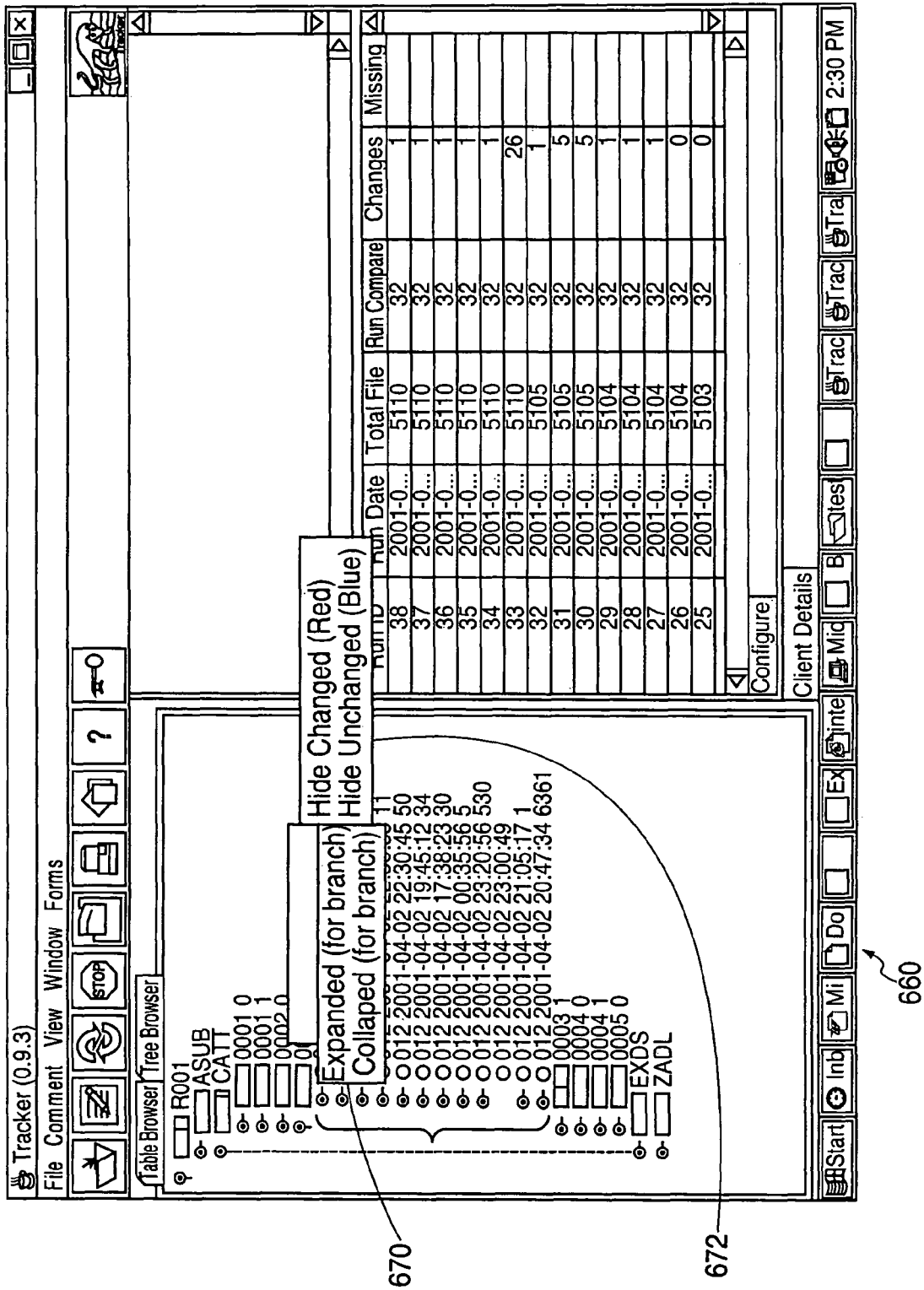
FIG. 16 is a screen display illustrating a user interface having selection menu displays allowing a user to select which categories to hide in accordance with embodiments of the present invention.

FIGS. 15 and 16, discussed below, illustrate one example of a category. FIG. 15 shows screen display 660 of UI 40. Screen display includes table display 662. As shown in table display 662, UI 40 is showing information from integrity server labeled "R001" which includes four computer systems labeled "ASUB", "CATT", "EXDS" and "ZADL". Computer system "CATT" has been expanded in tree display 662 to show that computer system "CATT" includes 8 subsystems, 664a-664g, which are being monitored. Each subsystem could be a server, client, sub-network (such as a domain) or set of files on a server, client or sub-network.

Tree display 662 shows that subsystem 664d has been expanded and includes an additional twelve sub-systems, collectively 668, which are being monitored. Each sub-system 668 has a round, filled in "ball" icon adjacent thereto. Each of these icons is displayed in a color. If a particular sub-system 668 has any files on it which have been altered, the ball icon associated with the sub-system is colored red. If, however, a particular sub-system 668 does not have any files which have been changed, then the ball icon is colored blue.

This is an example of a category, if file information for a first sub-system 668 shows that at least one file has been changed on that subsystem (for example, the sub-system belongs to a "changed" category), UI 40 will display a red ball icon adjacent to a branch associated with the subsystem. However, if file information for another subsystem 668 shows that no files have been changed on that subsystem (for example, the subsystem belongs to a "not changed" category), UI 40 will display a blue ball icon adjacent to a branch associated with the subsystem.

FIG. 15 shows a second view of screen display 660 illustrating the menu selection screen 670 that is created, as discussed below, when a tree display having categories is rendered by UI 40. Menu selection screen 670 includes the menu selection "Hide/show categories". As shown, selecting this menu selection brings up a second menu selection screen 672. From second menu selection screen 672, a user can choose to hide tree branches from selected categories. By selecting the "Hide Changed (Red)" selection on second menu selection screen 672, a user could hide the branches 668 associated with sub-systems having changed files. And by selection the "Hide Unchanged (Blue)" selection on second menu selection screen 672, a user could bide the branches 668 associated with systems having unchanged files.

FIGS. 14 and 15 show only a one example of how the category function of UI 40 operates. It is considered the data which determines categories could be any type of data. For example, without limitation, a categories for new files and/or deleted files are also within the ambit of the present invention. Additionally, categories can be indicated by any icon and/or color of icon.

Color Mapping

Color tags are supplied in the data and dynamically updated in a color editor contained in the UI 40. The color editor allows user-specific definition of colors associated with every tag encountered.

Figure 17:
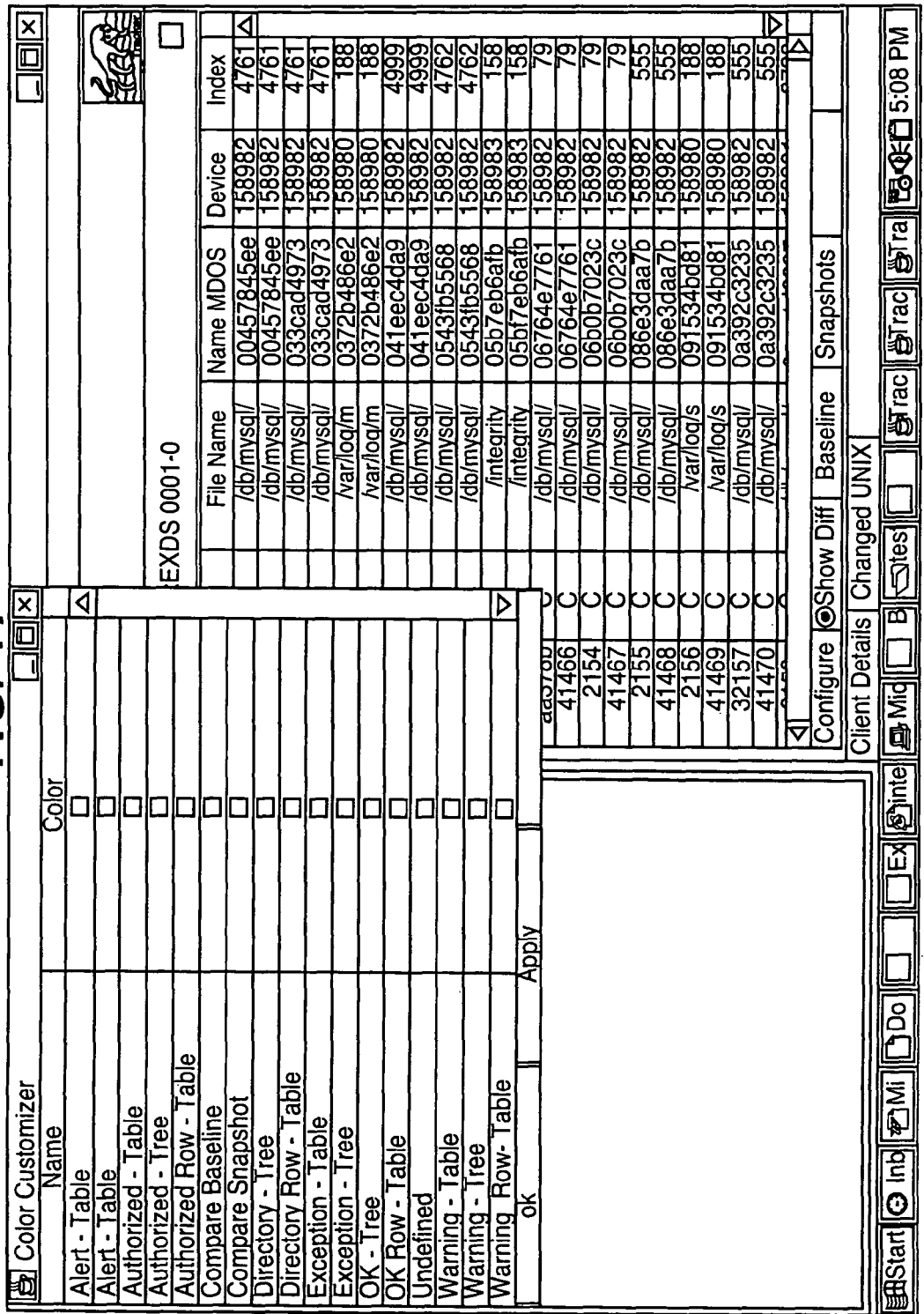
FIG. 17 is a screen display illustrating a user interface having user editable color attributes in accordance with embodiments of the present invention.

FIG. 17 illustrates a screen display 700 of UI 40 which shows how a user can create a definition of colors associated with every color tag encountered. As discussed below with respect to FIG. 12, when color tags are encountered, UI 40 creates a color edit menu 702. The left most column of color edit menu 702 lists the name of the field with which a color tag is associated. The right most column of color edit menu 702 shows the color currently associated with the listed field in the same row. By selecting a row, a user can edit the color associated with the field listed in the row.

Figure 18:
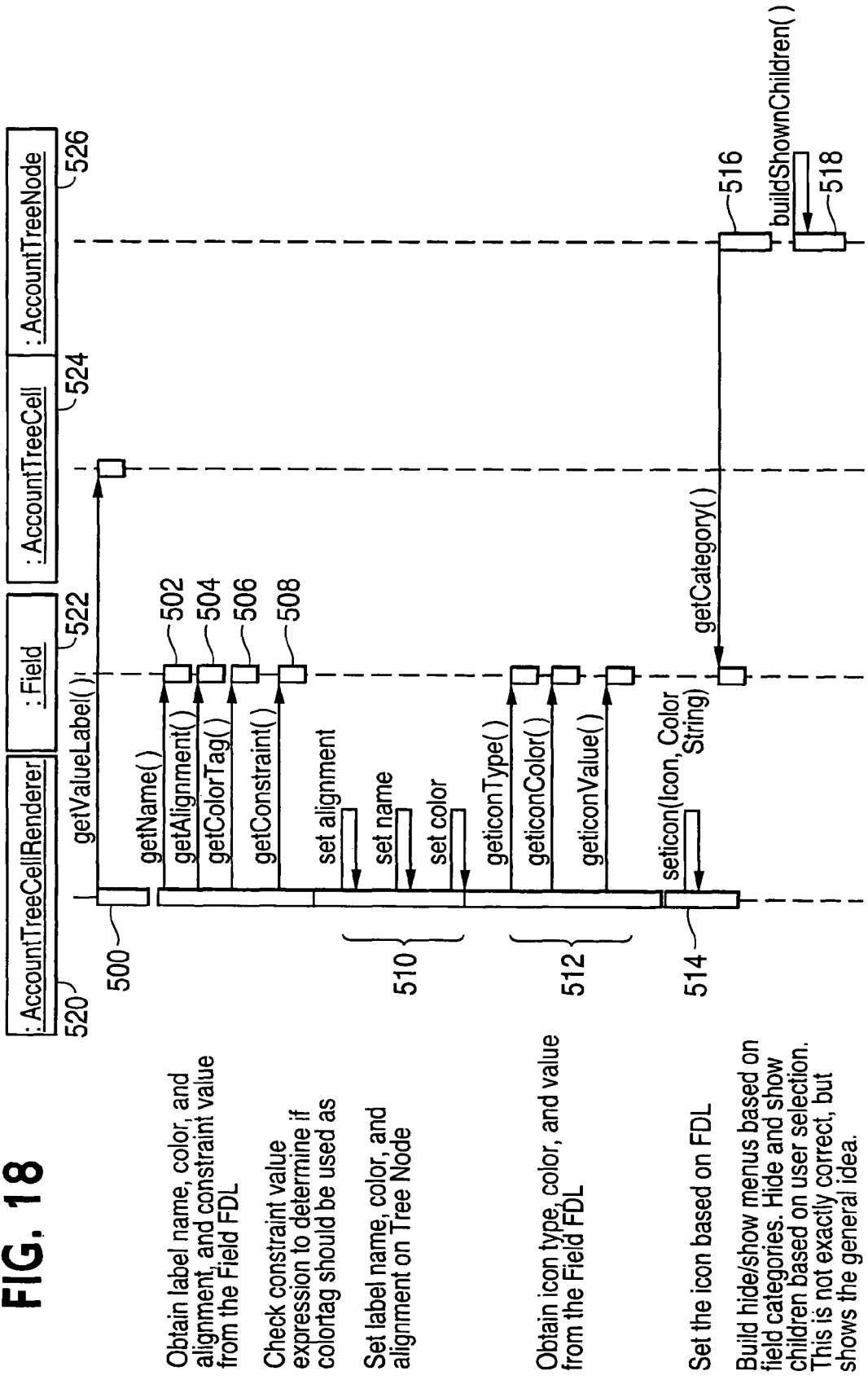
FIG. 18 is a sequence diagram illustrating a system and method for executing color tags, constraint tags, and categories in accordance with embodiments of the present invention.

FIG. 18 is a sequence diagram illustrating a system and method in accordance with the present invention for rendering a tree using constraints, categories and color mapping. Though the system and method of FIG. 18 is directed to rendering of a tree, rendering of any other view component, such as a table, is accomplished in a like manner.

As discussed above, when queried by UI 40, integrity server 100 returns FDL containing form data and value data to be provided in the form. This form data and value data is stored in-various modules in UI 40, as discussed below, and accessed to render a view component displaying values of parameters.

Referring now to FIG. 18, in 500, account tree cell renderer 520, which performs tree rendering functions such as colorizing and constraint checking, obtains from account tree cell 524 information about how the view component to be rendered will be generically laid out. For example, whether branches have values, icons or both and how and where lines of the tree will be laid out. Next, in 502, 504, 506 and 508, account tree cell renderer accesses field module 522, to obtain FDL that dictates the coloring, alignment of branches (for example, whether a branch is shifted to the right with respect to the branch above it) and names of branches of a tree to be rendered. Then, in 510, account tree cell renderer 520 sets these values for the tree to be rendered including determining whether any branches have constraints associated with them and, if so, determining if parameter values associated with those branches are within the limits set by the constraint. If one or more parameter values are not within the limits of a constraint which applies to that value, then account tree cell renderer will highlight (for example, color) the category icon accordingly associated with the appropriate branch.

In 512, account tree cell rendered returns to field module 522 and obtains information about an icons such as icons associated with sub-systems 668 shown in FIG. 15. The information that is retrieved in 512 includes the type of icon to be displayed (for example, a circle, box, tree folder icon, to name a few), the color of the icons and the value or state of the icon for the specific data which corresponds to the icon. In 514, the color, icon and value of the icon is set for the rendered tree.

In 516, account tree node module 526, which builds a category menu selection screens, such as category menu selection screens 670 and 672, shown in FIG. 16, to determine which categories are displayed on a tree, obtains information from field module 522 about which categories are included in the rendered tree. Then, in 518, account tree node builds the menu and shows the children from the category or categories selected to be displayed by the user from the menu.

Derived Fields

UI 40 can also used derived fields. Based on model data and associated formulas (defined in the data), UI 40 augments the record display with fields that are derived from other data field and attached functional links. To accomplish this, the custom FDL of the present invention uses a tag called "Derived From". This tag indicates that a field value is derived from the data of another field. Boolean values are used for a derived field.

Figure 21:
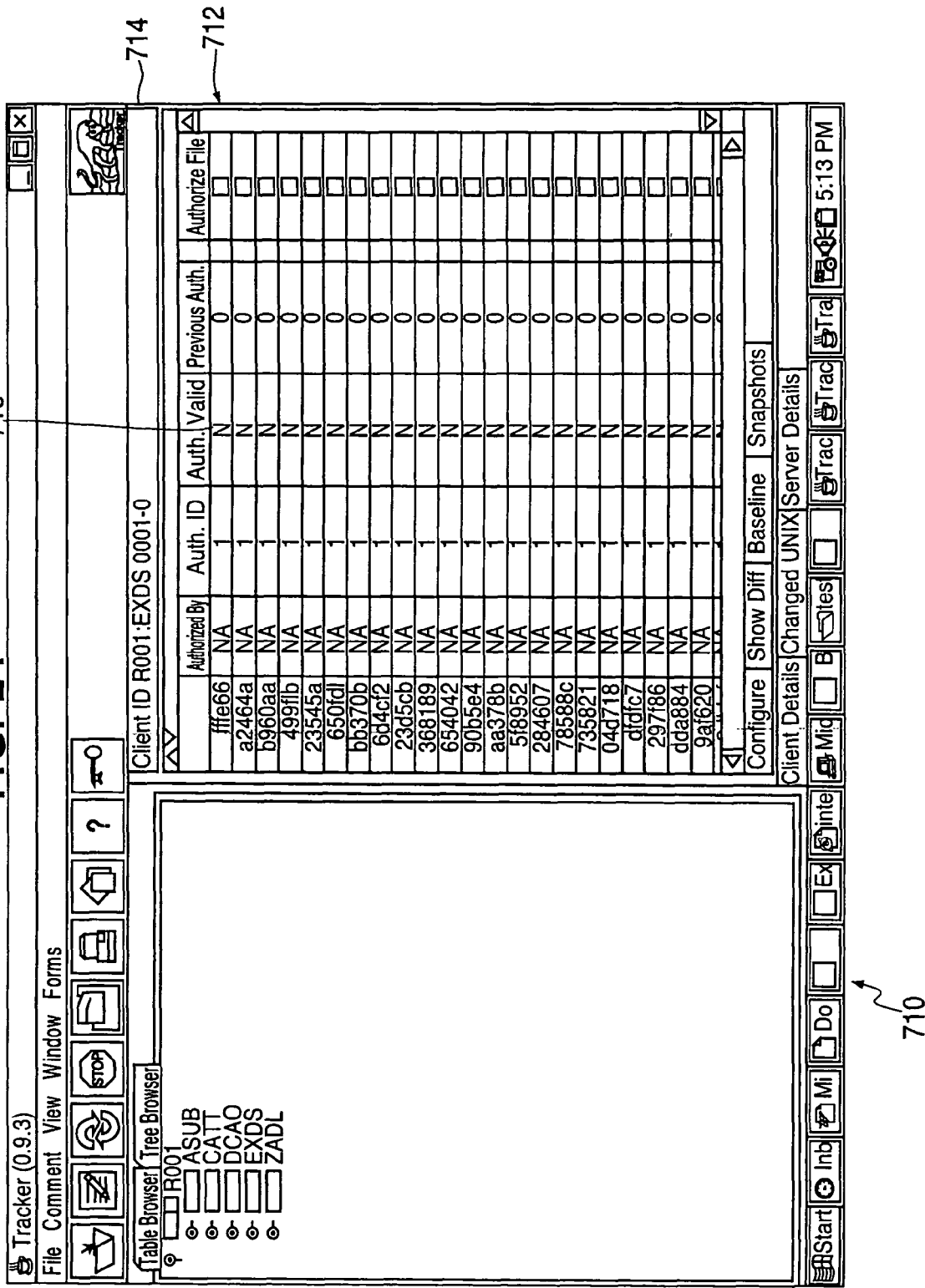
FIG. 21 is a screen display illustrating an example of a derived field-in a user interface in accordance with embodiments of the present invention.
Figure 22B:
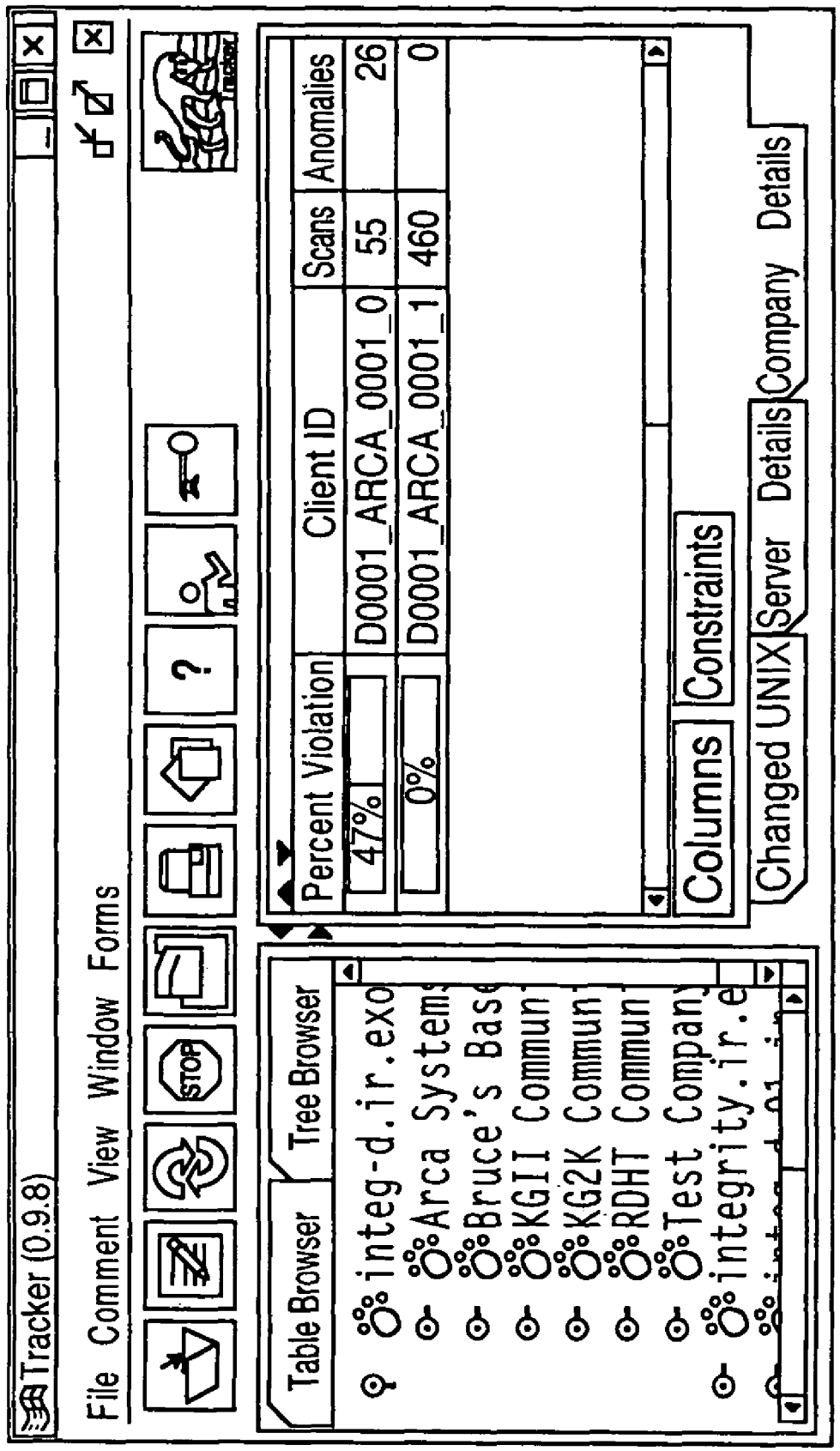
Figure 22C:
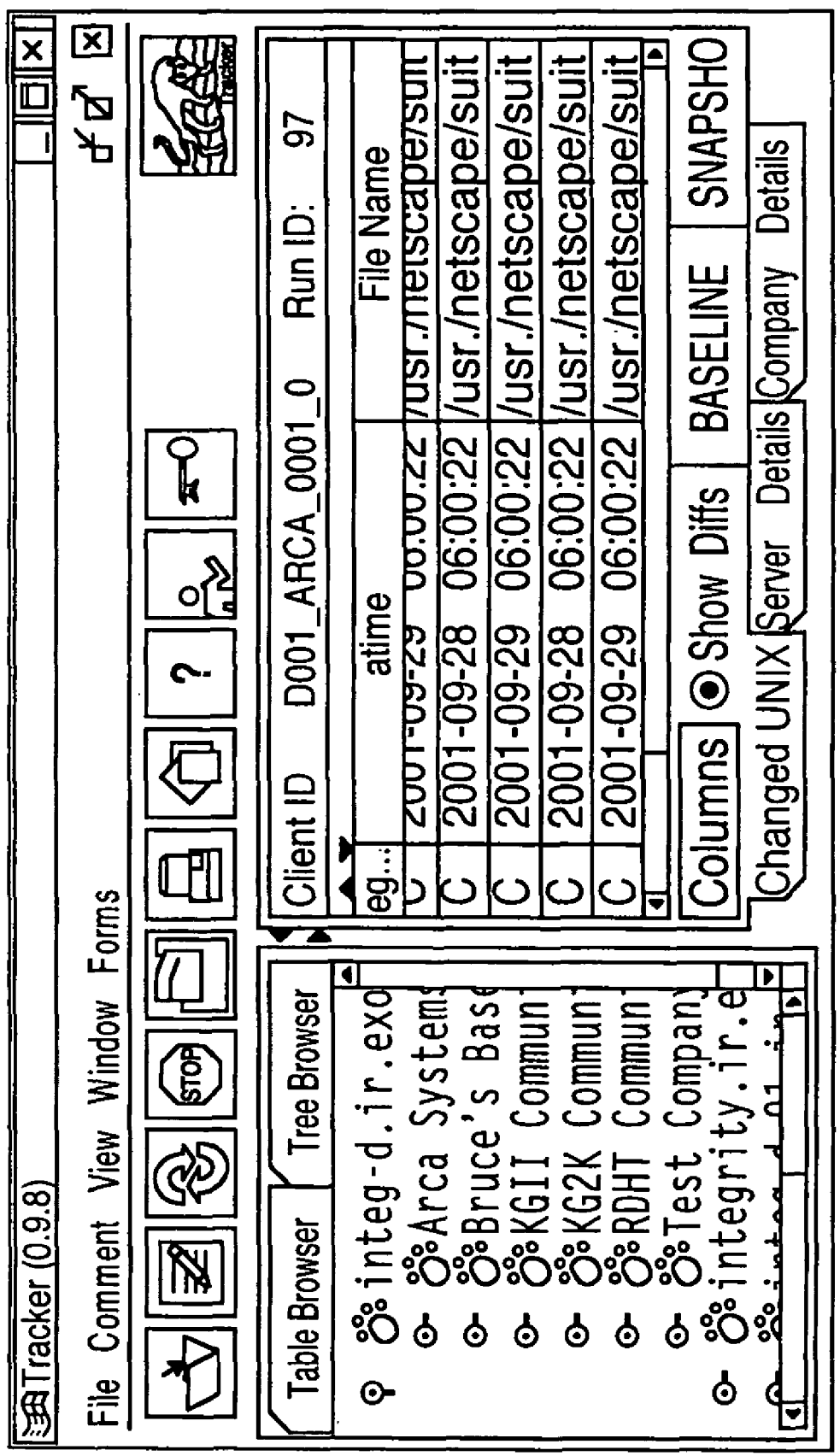
Figure 22E:
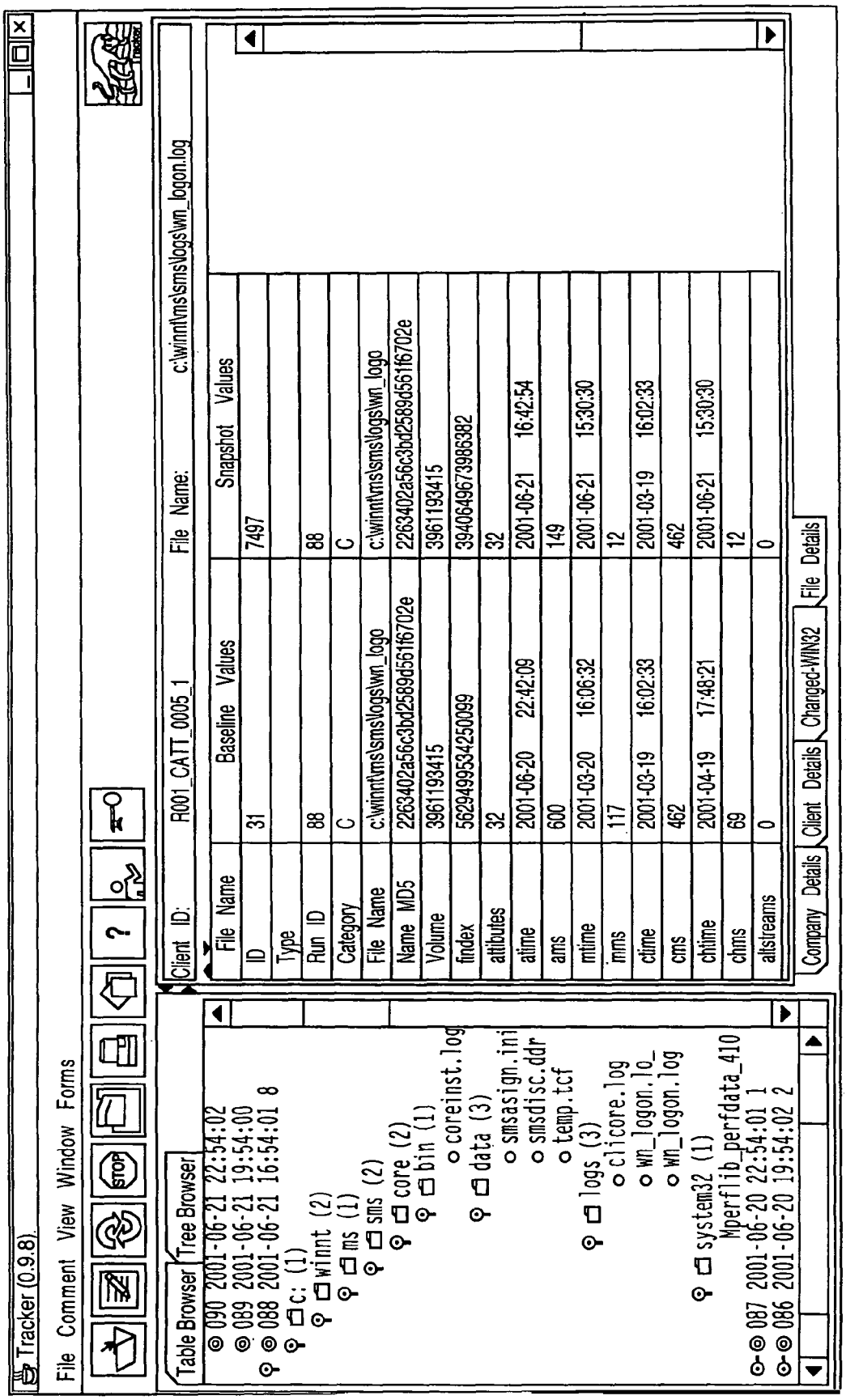
Figure 22G:
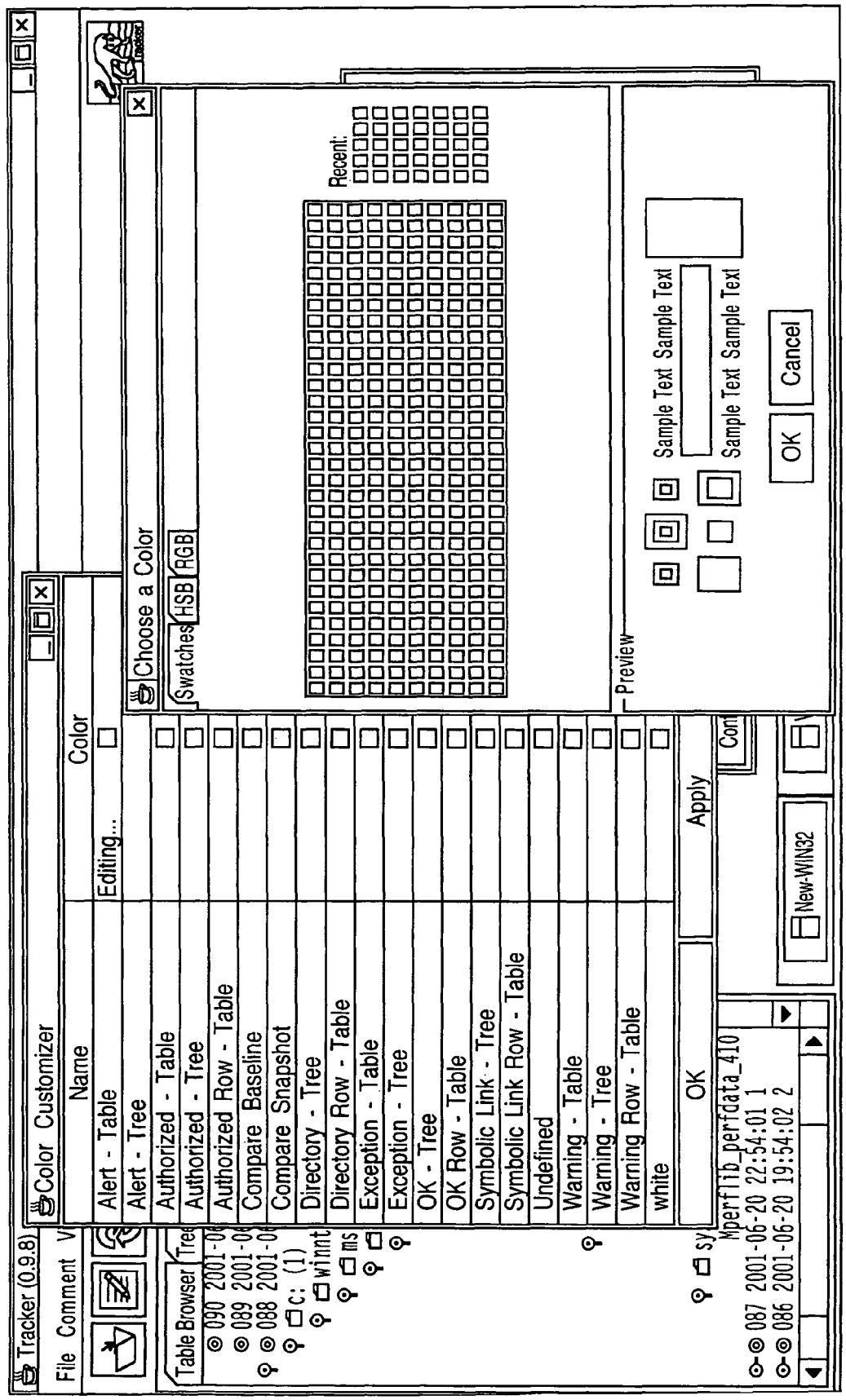
Figure 22I:
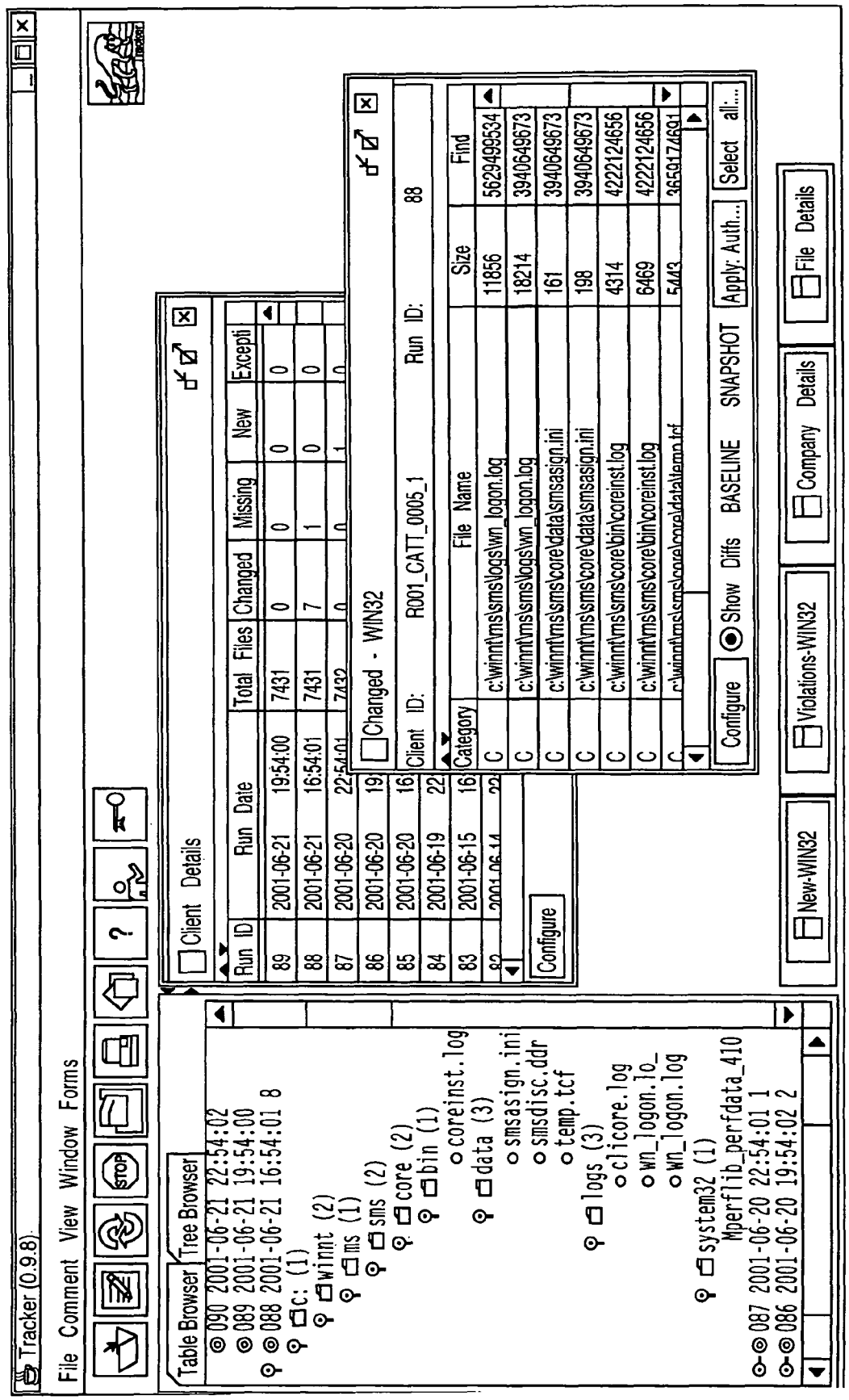
Figure 22L:
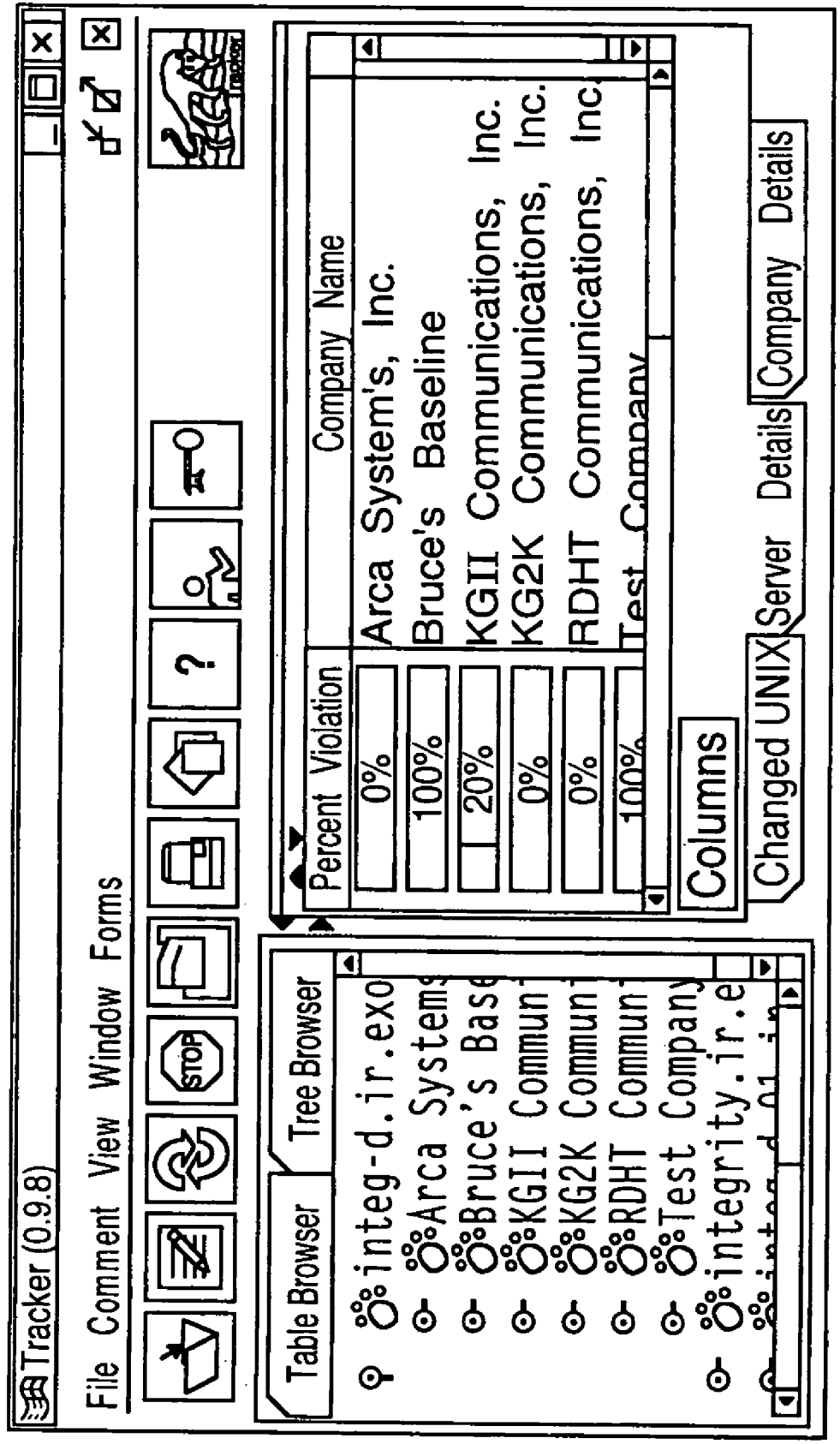

In embodiments of the present invention, the FDL returned from the CGI scripts module to construct the display type would include a field but the field would have no values. Using the "Derived From" tag, the FDL would indicate from what field the values should be derived. The UI 40 would then access the values for the derived field from the field named in the "Derived From" tag. For example, FIG. 21 illustrates a screen display 710 of UI 40 which includes table display 712. Column 714 of table display 712 is a column of checkboxes, the returned FDL could include a checkbox field which would correspond to column 714. The FDL would then indicate another field, to look at to determine whether the box should be checked or not. For example, in FIG. 21, the value of each entry in column 716, the "Auth Value" field, would determine whether the corresponding (by row) box in the "Authorize File" column 714 would be checked.

Code Execution

The custom FDL in accordance with the present invention can also cause a user interface, in accordance with embodiments of the present invention, to execute lines of code when a link or other device is activated. The tag "Code Execution" is used to implement this function. The argument of the "Code Execution" tag is the code to be executed, which is provided in the form of a class to be loaded and a method of the class to be executed. When the link or other associated device is activated, UI 40 executes the code indicated in the argument of the code execution tag.

Figure 19:
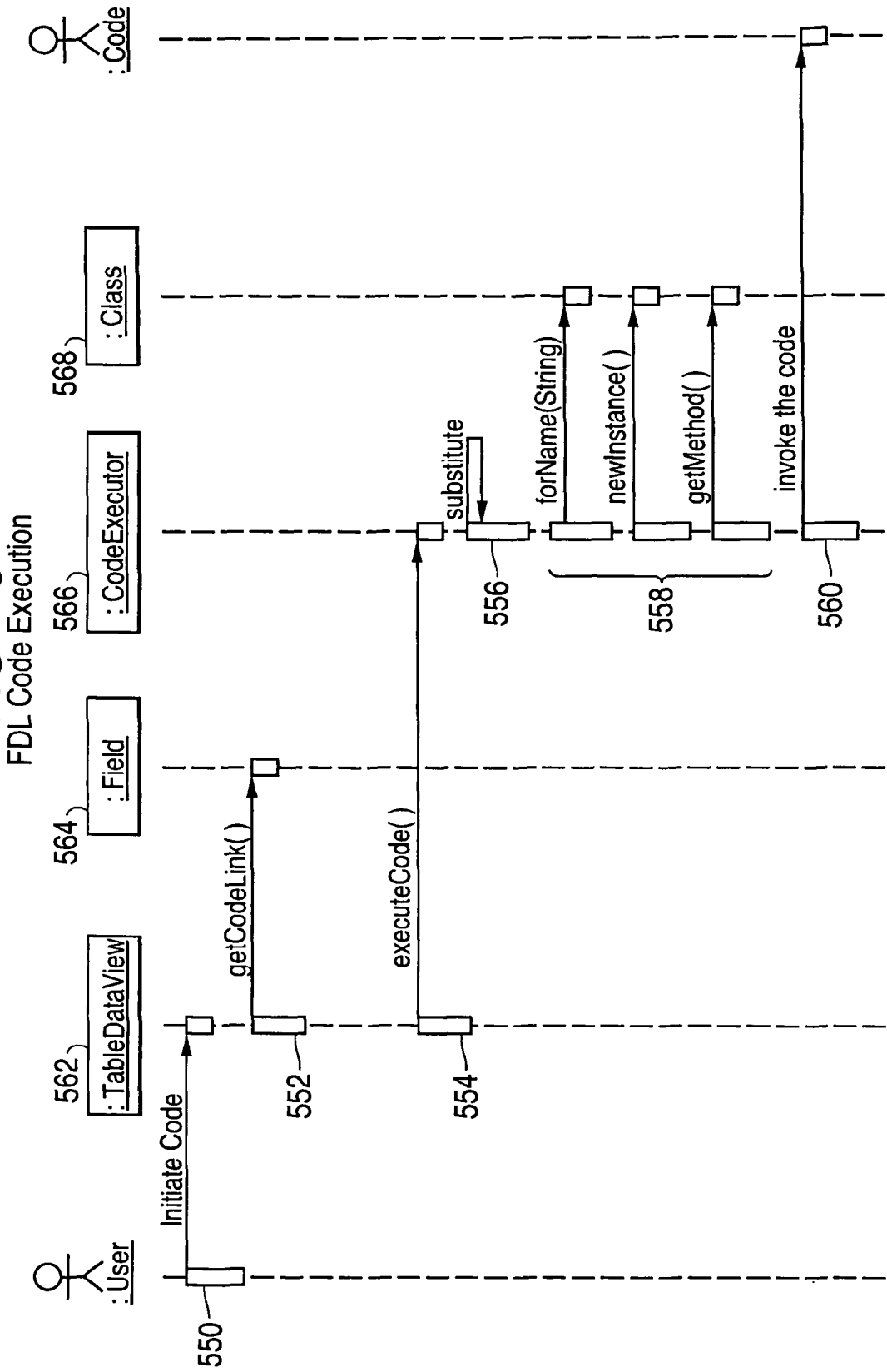
FIG. 19 is a sequence diagram illustrating a system and method for carrying out code execution in accordance with embodiments of-the present invention.
Figure 20:
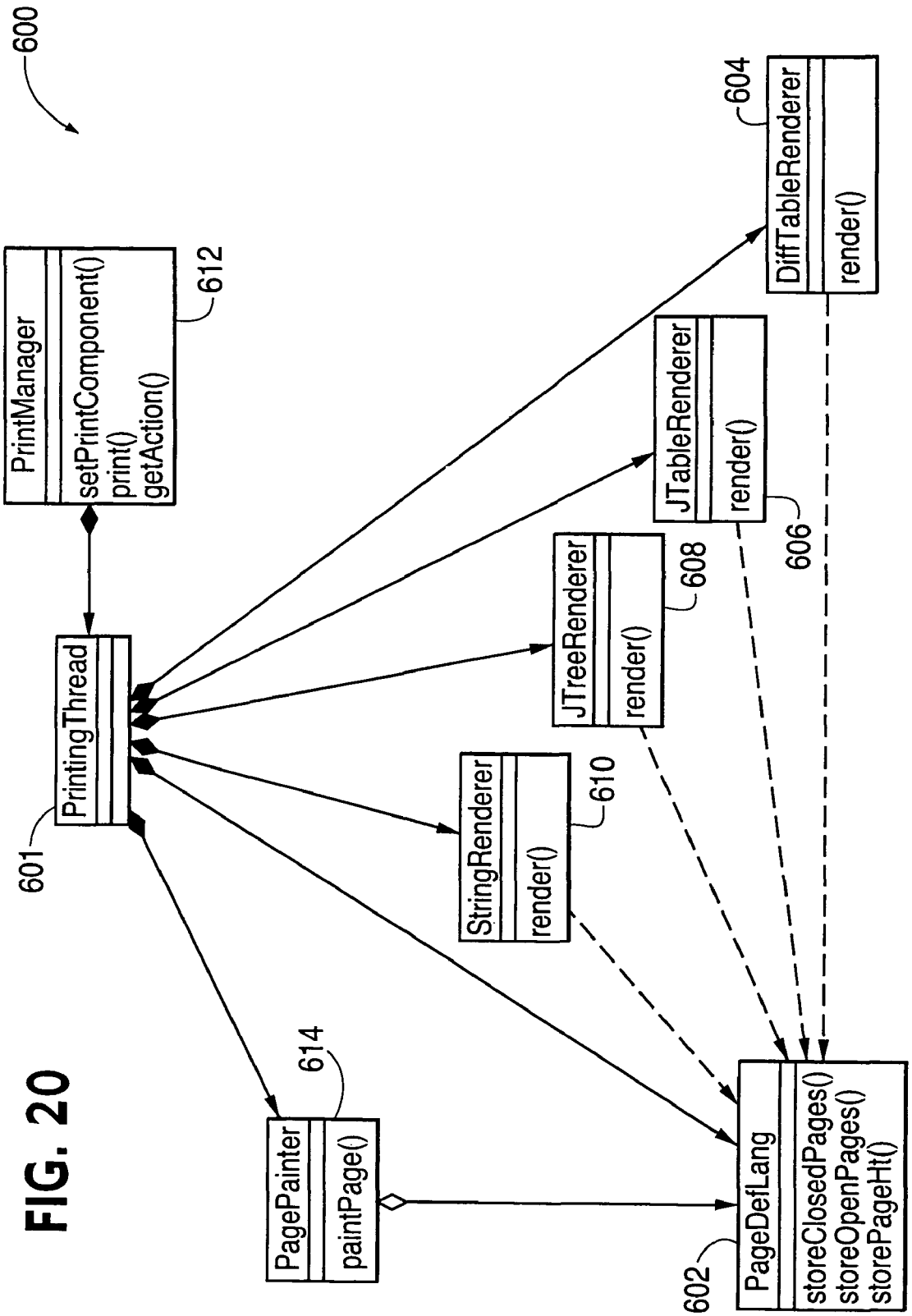
FIG. 20 is a block diagram illustrating a system and method for printing display components of a user interface in accordance with embodiments of the present invention.

FIG. 19 is a sequence diagram illustrating a system and method for executing code when activating a link or other device in a user interface in accordance with the present invention. In 550, a user of analyst client 50 activates a link as discussed above, or other device on UI 40 and the initiation is passed to table data view module 562 which manages a portion of the code execution process. In 552, table data view module 562 retrieves the tag associated with the activated code execution link. Then, in 554, table data view module 562 provides the retrieved tag to code executor 566, which contains a dynamic substitution algorithm and manages the remainder of the code execution process and invokes the code.

In 556, code executor 566 provides the argument for the variable in the code execution tag. Specifically, code executor 566 will substitute at least the class and method of the code to be executed. In 558, code executor 556 will complete "forName", "newInstance" and "getMethod" routines to load the code to be executed. The "forName", "newInstance" and "getMethod" routines are standard Java routines known to those skilled in the art. In 560, code executor 566 will execute the code.

Printing

Printing for the UI 40 is implemented in an object-oriented fashion. That is to say the print package can be taken as is and be reused in any Java application and easily extended with new functionality.

FIG. 15 is a block diagram illustrating the printing architecture for UI 40. The gateway to this printing capability is the printing thread module 601, which is typically constructed with a Java array list and a title and is managed by print manager 612. The array list contains a list of Java objects such as a string, a tree or a table, that need to be rendered in one continuous print job. Any application may build an array list of objects and s send it to a spawned printing thread module 601. The printing thread now examines each object and determines its type, typically a string, tree or table. The printing thread module 601 then calls an appropriate rendering class that has one public method called render. The render method takes the object to be printed and an instance of a PageDefLang module 602.

PageDefLang module 602 is a class that implements a page definition language, PDL (described below). It stores the data pertaining to the print job.

Four separate renderers exist in UI 40 although it is considered to have any number of renderers. They are DiffTableRenderer 604, which renders difference tables; JTableRenderer 606, which renders tables; JTreeRenderer 608, which renders trees; and StringRenderer 610, which renders strings. UI 40 has the ability to print any components that build upon these four classes. For example, a text area in UI 40 can be printed by getting each of its lines of text and passing them to StringRenderer 610.

This object-oriented design advantageously allows a developer skilled in the art to take the print package and add functionality to render custom components. In order to do this, the developer would construct a custom renderer class to handle new object types. DiffTableRenderere 604 is an example of this. As discussed above, a difference table is a custom table used by UI 40 that shows differences between rows.

The column widths of a table to be printed have to be decided intelligently. This is to prevent a wide column String from making the column four times the size of most of its data. This optimal size will be the maximum size of the column's data Strings only if it is acceptable small. Otherwise it is assigned by finding a width that will contain 75% of the column's data Strings. If the result is very small, the value will be found again to be a width that will contain 90% of the column's data Strings. Finding a good optimal width in this repetitive method helps to minimize white space.

The renderer decides how many columns of the table can be fit onto each page given the specifications stored in the PDL (Landscape, 8.5×11, etc.). This enables generating tables that are multiple pages wide. Now the data is read in from the table and interpreted into the page definition language described above.

In order to force an optimal column size, strings which are larger than the optimal size must be wrapped. This String wrapping is also done in a desirable way.

A String will be wrapped on special characters like spaces, period, commas, parentheses, etc. If a string does not contain any special characters close to where the wrap point was designated, printing architecture 600 will remember the first truncation of the string that fits within the wrap point.

The various mechanisms of the present invention may be implemented in software, hardware or any combination thereof.

The systems and methods of the present invention are discussed below in embodiments which perform an integrity monitoring function for computer systems. However the system and method for retrieving and displaying data is applicable to any context in which data is to be retrieved from a computer database and displayed by a user on a screen or print display.

Other embodiments of the present invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A system for monitoring the integrity of at least one client computer, comprising:
   an analyst computer comprising a visual display unit configured to support a graphical user interface;
   an integrity checker provided in communication with the client computer for obtaining integrity information about files on the client computer, including critical system files, where the obtaining is performed on a periodic schedule; and
   an integrity server provided in communication with the integrity checker for obtaining and storing client integrity information from the integrity checker, and provided in communication with the analyst computer for providing information to the analyst computer;
   wherein the graphical user interface is configured to retrieve the client integrity information stored by the integrity server and to display the client integrity information on the visual display unit to allow a user to analyze the client integrity information,
   wherein integrity information includes information about the integrity of files,
   wherein the periodic schedule includes at least two schedule sets, a first schedule set with a first periodic schedule for checking the integrity of a first set of files with a first priority, and a second schedule set with a second periodic schedule for checking the integrity of a second set of files with a second priority, wherein both periodic schedules check integrity at least once every twenty-four hours, and a periodic schedule with a higher associated priority includes more frequent checks than a periodic schedule with a lower associated priority, wherein the information about the integrity of files is reported to both an administer of the system and a user of the analyst computer, and wherein the integrity server retains a historical log of client integrity information over a period of time and is configured to compare results of prior integrity checks with subsequent integrity checks.

2. A system as in claim 1 wherein the integrity server comprises at least one integrity database which stores the client integrity information provided by the integrity checker.

3. A system as in claim 1 wherein the integrity checker is located on the client computer.

4. A system as in claim 1 wherein the integrity checker checks status of files located on the client computer; wherein the integrity server collects, stores and retrieves the client integrity information generated by the integrity checker.

5. A system according to claim 4, wherein an alarm message is generated when the status of files is changed.

6. A system according to claim 4, wherein the integrity checker is software installed on the client computer.

7. A system according to claim 4, wherein the integrity checker is hardware installed on the client computer.

8. A system according to claim 4, wherein the integrity checker is on a separate server from the integrity client computer.

9. A system according to claim 1, wherein the interconnection between the integrity server and the integrity checker is provided by a secure sockets layer (SSL) network connection.

10. A system according to claim 1, wherein the integrity checker provides integrity information about the client computer to the integrity server.

11. A system according to claim 2, wherein the user interface allows a user using the analyst computer to browse the at least one integrity database.

12. A system for monitoring the integrity of at least one client computer, comprising:

an integrity checker provided in communication with the client computer for obtaining integrity information about files on the client computer, including critical system files;

an integrity server provided in communication with the integrity checker for obtaining and storing client integrity information from the integrity checker, and provided in communication with an analyst computer for providing information to the analyst computer, wherein the integrity server comprises at least one integrity database which stores data provided by the integrity checker, and wherein the analyst computer comprises:

a visual display unit for supporting a graphical user interface constructed and adapted to retrieve the client integrity information stored by the integrity server and to display the client integrity information on the visual display unit to allow a user to analyze the client integrity information, wherein the integrity checker checks status of files located on the client computer on a periodic schedule; wherein the integrity server collects, stores and retrieves data generated by the integrity checker and wherein an alarm message is generated when the status of files is changed, wherein the user interface allows a user using the analyst computer to browse the at least one integrity database, wherein the periodic schedule includes at least two schedule sets, a first schedule set with a first periodic schedule for checking the integrity of a first set of files with a first priority, and a second schedule set with a second periodic schedule for checking the integrity of a second set of files with a second priority, wherein both periodic schedules check integrity at least once every twenty-four hours, and a periodic schedule with a higher associated priority includes more frequent checks than a periodic schedule with a lower associated priority,and wherein the integrity server retains a historical log of client integrity information over a period of time and is configured to compare results of prior integrity checks with subsequent integrity checks.

13. A method, operative in a system for monitoring the integrity of at least one client computer, where the system comprises:

an integrity checker provided in communication with the client computer for obtaining integrity information about files on the client computer, including critical system files; and an integrity server provided in communication with the integrity checker for obtaining and storing client integrity information from the integrity checker, including information about the integrity of files, and provided in communication with an analyst computer for providing information to the analyst computer, the method comprising:

(a) checking a status of files located on a client computer according to a periodic schedule;

(b) collecting, storing and retrieving data generated by the integrity checker;

(c) storing the client integrity information provided by the integrity checker in at least one integrity database in the integrity server;

(d) retrieving the client integrity information stored by the integrity server; and (e) displaying the client integrity information on a visual display unit connected to the analyst computer to allow a user to analyze the client integrity information, including a historical log of client integrity information over a period of time and is configured to compare results of prior integrity checks with subsequent integrity checks, wherein the periodic schedule includes at least two schedule sets, a first schedule set with a first periodic schedule for checking the integrity of a first set of files with a first priority, and a second schedule set with a second periodic schedule for checking the integrity of a second set of files with a second priority, wherein both periodic schedules check integrity at least once every twenty-four hours, and a periodic schedule with a higher associated priority includes more frequent checks than a periodic schedule with a lower associated priority.

14. The method according to claim 13, further comprising: generating an alarm message on the visual display unit when the status of a file on the client computer is changed.

15. The system of claim 1, wherein the obtaining periodic schedule has multiple tiers, such that integrity information about files with a higher priority is obtained more often than files with a lower priority.

16. The system of claim 1, wherein the periodic schedule is adjustable via the analyst computer.

17. The method of claim 13, wherein the obtaining is performed on a periodic schedule.

18. The method of claim 13, wherein the files on the client computer are prioritized, wherein the obtaining is performed more often for higher priority files and less often for lower priority files.

* * * * *